(12) United States Patent
Du et al.

(10) Patent No.: US 7,268,944 B2
(45) Date of Patent: Sep. 11, 2007

(54) OPTICAL INTERLEAVER, FILTER CELL, AND COMPONENT DESIGN WITH REDUCED CHROMATIC DISPERSION

(75) Inventors: Tengda Du, Fremont, CA (US); Kevin Dapeng Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 228 days.

(21) Appl. No.: 10/866,418

(22) Filed: Jun. 11, 2004

(65) Prior Publication Data

US 2005/0041290 A1    Feb. 24, 2005

Related U.S. Application Data

(63) Continuation-in-part of application No. 10/170,055, filed on Jun. 12, 2002, now Pat. No. 6,850,364.

(51) Int. Cl.
*G02B 5/30* (2006.01)
(52) U.S. Cl. .................. 359/499; 359/497; 359/498; 398/81; 385/11
(58) Field of Classification Search ................. 359/641
See application file for complete search history.

(56) References Cited

U.S. PATENT DOCUMENTS

| | | | |
|---|---|---|---|
| 4,094,581 A | 6/1978 | Baldwin et al. | |
| 4,685,773 A | 8/1987 | Carlsen et al. | |
| 4,813,761 A | 3/1989 | Davis et al. | |
| 4,987,567 A | 1/1991 | Buhrer | |
| 5,596,661 A | 1/1997 | Henry et al. | |
| 5,606,439 A | 2/1997 | Wu | |
| 5,694,205 A | 12/1997 | Gualtieri et al. | |
| 5,694,233 A | 12/1997 | Wu et al. | |
| 5,867,291 A | 2/1999 | Wu et al. | |
| 6,005,697 A | 12/1999 | Wu et al. | |
| 6,040,932 A | 3/2000 | Duck et al. | |
| 6,208,444 B1 | 3/2001 | Wong et al. | |
| 6,373,604 B1 | 4/2002 | Xie | |
| 7,050,671 B1* | 5/2006 | Zhang et al. | 385/27 |
| 2002/0041611 A1* | 4/2002 | May | 372/29.02 |
| 2002/0097957 A1* | 7/2002 | Kikuchi et al. | 385/33 |

* cited by examiner

*Primary Examiner*—Stephone B. Allen
*Assistant Examiner*—Derek S. Chapel
(74) *Attorney, Agent, or Firm*—Workman Nydegger

(57) ABSTRACT

An optical interleaver for use in a range of telecommunications applications including optical multiplexers/demultiplexers and optical routers. The optical device includes an optical processing loop which allows multi-stage performance characteristics to be achieved with a single physical filtration stage. Optical processing on the first leg and second legs of the loop is asymmetrical thereby improving the integrity of the optical signals by effecting complementary chromatic dispersion on the first and second legs. A fundamental filter cell within the interleaver filters optical signals propagating on each of the two legs of the optical loop which intersects the fundamental filter cell.

35 Claims, 13 Drawing Sheets

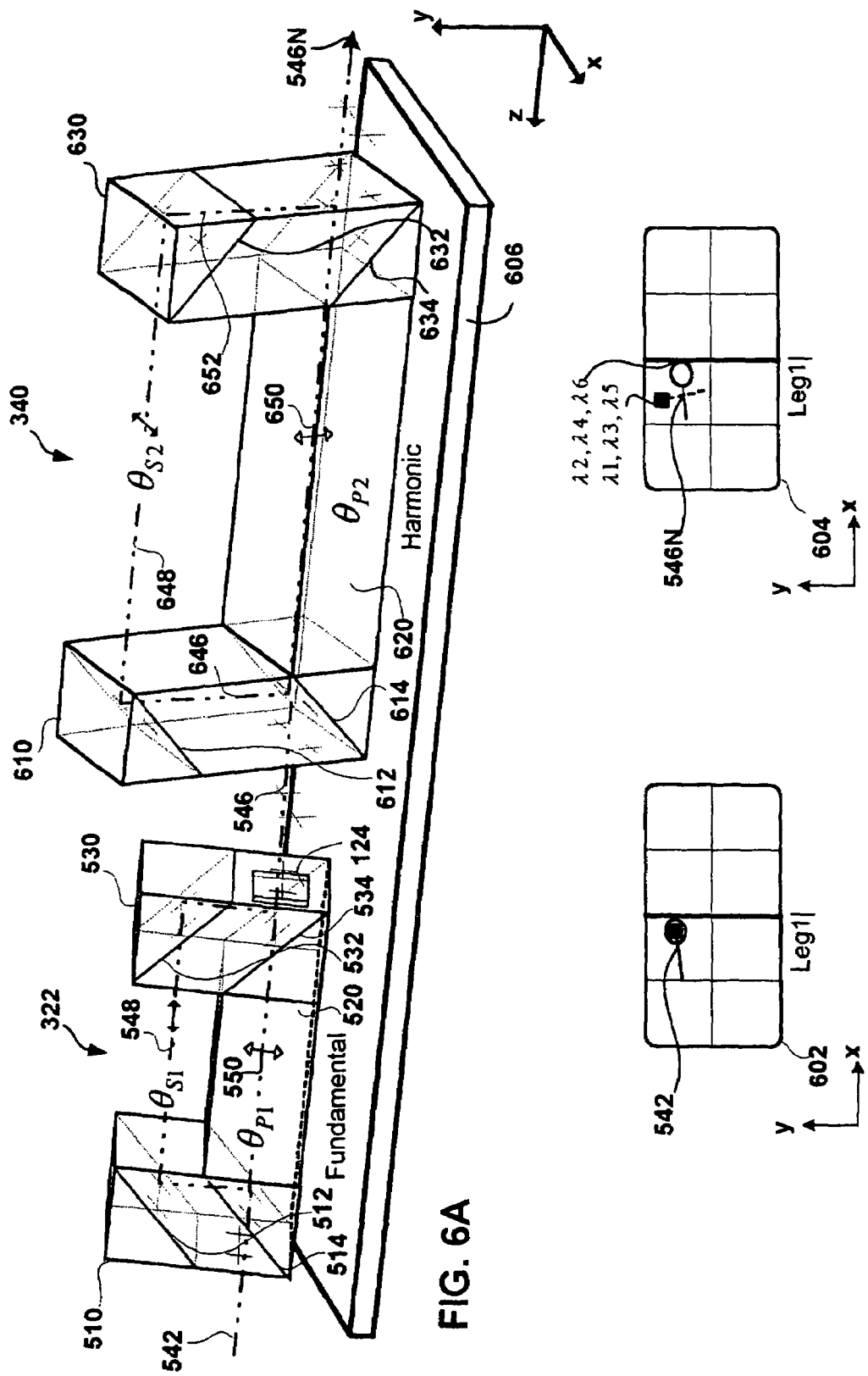

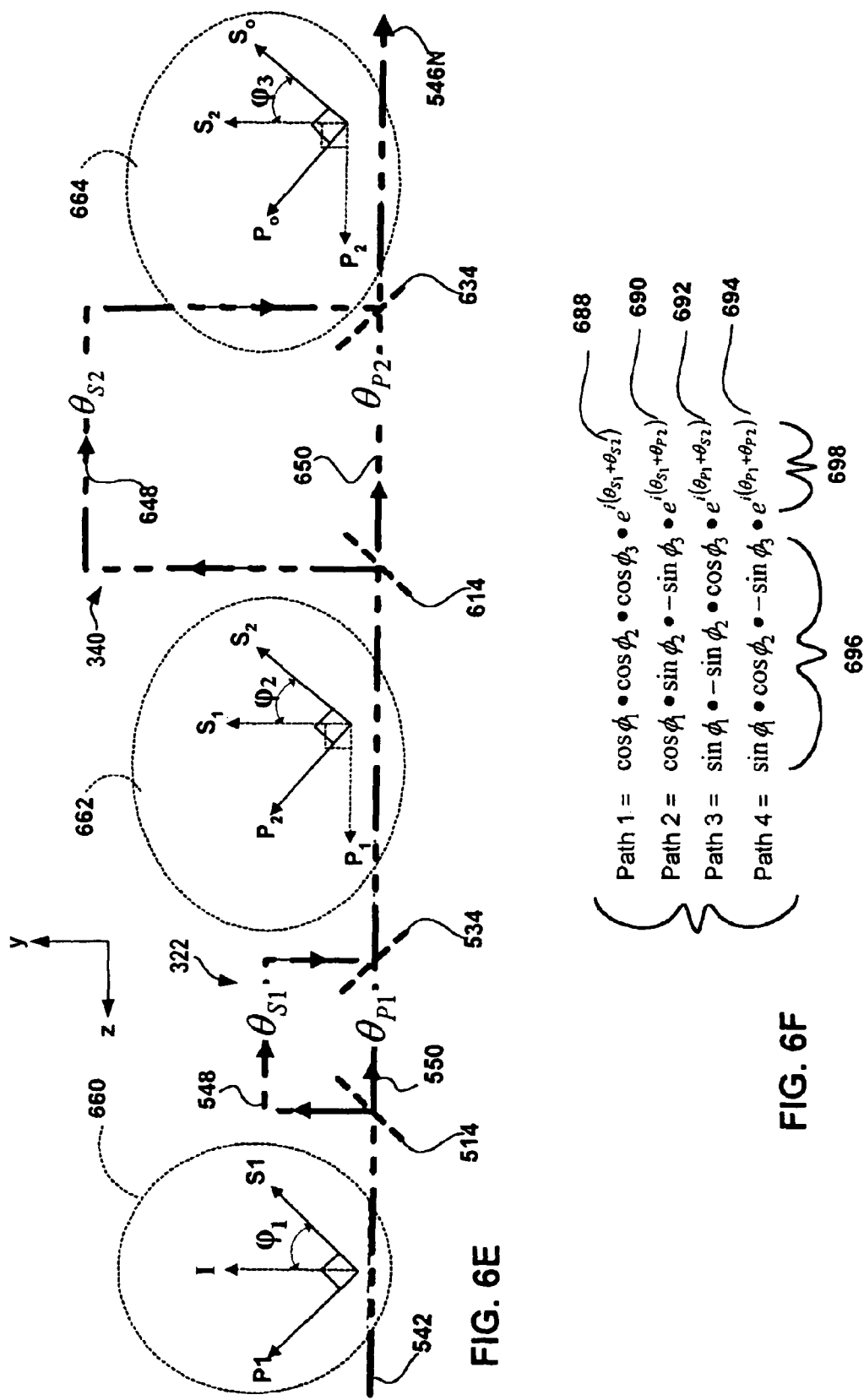

OPTICAL INTERLEAVER, FILTER CELL, AND COMPONENT DESIGN WITH REDUCED CHROMATIC DISPERSION

CROSS-REFERENCE TO RELATED APPLICATIONS

This application is a continuation-in-part of application Ser. No. 10/170,055 entitled "METHOD AND APPARATUS FOR AN OPTICAL MULTIPLEXER AND DEMULTIPLEXER WITH AN OPTICAL PROCESSING LOOP" filed Jun. 12, 2002, now U.S. Pat. No. 6,850,364 which is incorporated by reference in its entirety.

BACKGROUND OF THE INVENTION

1. The Field of the Invention

The present disclosure generally relates to optical interleavers, filters, and components, and more particularly to optical interleavers, filters, and components for optical fiber communication networks.

2. Background and Related Art

The Synchronous Optical Network (SONET) standard defines a hierarchy of multiplexing levels and standard protocols which allow efficient use of the wide bandwidth of fiber optic cable, while providing a means to merge lower level DS0 and DS1 signals into a common medium. Currently optical communication is accomplished by what is known as "wavelength division multiplexing" (WDM), in which separate subscriber/data sessions may be handled concurrently on a single optic fiber by means of modulation of each of those subscriber data streams on different portions, a.k.a. channels, of the light spectrum.

The spacing between channels is constantly being reduced as the resolution and signal separation capabilities of multiplexers and demultiplexers are improved. Current International Telecommunications Union (ITU) specifications call for channel separations of approximately 0.4 nm, i.e., 50 GHz. At this channel separation as many as 128 channels may be supported in C-band alone. Each channel is modulated on a specific center frequency, within the range of 1525-1575 nm, with the center frequency of each channel provided by a corresponding one of 128 semiconductor lasers. The modulated information from each of the semiconductor lasers is combined (multiplexed) onto a single optic fiber for transmission. As the length of a fiber increases the signal strength decreases. To offset signal attenuation erbium doped fiber amplifiers (EDFAs) are used at selected locations along the communication path to boost signal strength for all the channels. At the receiving end the processes is reversed, with all the channels on a single fiber separated (demultiplexed), and demodulated optically and/or electrically.

Optical filters play important roles in handling these optical communications for the telecommunications industry. They perform wavelength multiplexing and demultiplexing of the 128 or more optical channels. They may also be used to gain scale EDFAs by flattening their gain profile.

The requirements for optical filters used for any of these applications are very demanding. The close spacing between the channels in a WDM, makes it desirable to design a WDM with flat pass bands in order to increase the error tolerance. This is primarily because the center wavelength of a transmitter slips with temperature. Further, the cascading of the WDM stages causes the pass bands to become narrower at each WDM down the chain. Therefore, the larger the pass bands the greater the shift tolerance of the channel. With faster data rates, it is also becoming increasingly important to reduce or eliminate sources of chromatic dispersion while processing optical signals.

Various devices, such as multi-stage band and comb splitters, have been proposed to fill these new demanding requirements and none are fully satisfactory. In a multi-stage band splitter, the first stage makes a coarse split of two wavelength ranges, and subsequent stages make finer and finer splits of sub-bands within each of the wavelength ranges. In a multi-stage comb splitter, the first demultiplexing stage filters out two interlaced periodic sets of relatively narrow band passes and the subsequent stages employ wider band pass periodic filters until the individual channels are demultiplexed. In either case, noise and inter-channel interference are limiting factors in the handling of increasingly narrow band pass requirements. Multi-layer thin-film filters can be used to construct optical filters in bulk optics, but they are undesirable because of an increase in the number of layers for narrow channel spacing, precision of manufacture and expense associated with increasingly narrow band pass requirements. Further, dispersion will become a major issue as channel spacing decreases. Especially at 50 GHz channel spacing, dispersion of thin film filters is so big that it can not be used for an OC-192 signal (10 Gbit/sec). Mach-Zehnder interferometers have been widely employed, but they have a sinusoidal response giving rise to strongly wavelength dependent transmission and a narrow rejection band. Other designs have encountered a variety of practical problems.

Accordingly, there is a need for new optical filters and components for optical multiplexing and/or demultiplexing and other optical applications

BRIEF SUMMARY OF THE INVENTION

In general, an optical interleaver, filter cell, and component design is provided for use in a wide range of telecommunications, network, and other applications, generally including optical multiplexers/demultiplexers and optical routers. In one example embodiment, an optical interleaver splits and combines optical signals of frequency division multiplexed optical communication channels which are evenly spaced apart in frequency from one another. The optical interleaver includes an optical processing loop which allows multi-stage performance characteristics to be achieved with a single physical filtration stage. Optical processing on the first leg and second legs of the loop improves the integrity of the optical signals by effecting complementary chromatic dispersion on the first and second processing legs. The single physical filtration stage includes a fundamental filter cell and may include one or more harmonic filters. Waveplates may be used to rotate polarization in order to adjust splitting ratios and in order to align interleaver components for more convenient packaging.

In another example embodiment, the optical interleaver for processing optical signals includes a fundamental filter cell, a retro reflector and an optical polarization beam displacer. The fundamental filter cell filters optical signals propagating on each of two legs of an optical loop which intersects the fundamental filter cell. The fundamental filter cell operates as a full waveplate to one set of one or more optical signals and a half waveplate to another set of one or more optical signals on a selected one of the two legs and as a half waveplate to the one set of one or more optical signals and a full waveplate to the other set of one or more optical signals on a remaining one of the two legs. The retro reflector optically couples with the fundamental filter cell to reflect the optical signals from one of the two legs to the other of the two legs to form the optical loop. The optical polarization beam displacer optically couples between the fundamental filter cell and the retro reflector to split or combine the optical signals depending on the polarization and propagation direction of the optical signals along the optical loop. In some embodiments, a single polarization beam splitter, as opposed to a birefringent crystal, may be used as the optical polarization beam displacer. Based on the particular implementation, the sets of one or more optical signals may correspond to an odd set of channels and an even set of channels, or may correspond to one or more arbitrary optical signals that are interleaved or are to be interleaved with one or more other optical signals, and so forth.

In an alternate embodiment of the invention, an optical interleaver for processing optical signals between a first port communicating one set of one or more optical signals together with another set of one or more optical signals and second and third ports separately communicating the sets of optical signals is disclosed. The optical interleaver includes: a fundamental filter cell, a retro reflector, and an optical polarization beam displacer. The fundamental filter cell optically couples on one side to all of the ports.

The fundamental filter cell exhibits a first and a second free spectral range (FSR) to optical signals propagating on an optical loop with a first leg coupled to the first port and a second leg coupled to the second and third ports. The first and second FSRs are offset with respect to one another to effect substantially complementary chromatic dispersions for each optical signal. The retro reflector optically couples with the fundamental filter cell to reflect the optical signals from one of the legs to the other of the legs to form the optical loop. The optical polarization beam displacer optically couples between the fundamental filter cell and the retro reflector to split or combine the optical signals depending on the polarization and propagation direction of the optical signals along the optical loop.

In some embodiments, a polarization beam splitting cell that may be used within a filter cell and/or other optical components are tilted with respect to the propagation direction of the optical signals so as to reduce chromatic dispersion ripple that would otherwise be introduced if the polarization beam splitting cell or other optical components were normal to the propagation direction. In a more generalized embodiment, one or more optical components, having two potentially parallel surfaces and placed between two collimators, are tilted at an angle from normal with respect to the optical signal to reduce chromatic dispersion. The tilt angle depends on the particular application of an optical processing device, but for an example polarization beam splitting cell embodiment, falls between approximately 0 and 5 degrees. In other embodiments, the tilt angle may be significantly larger. Zero-order waveplates may be used to rotate polarization in order to adjust splitting ratios and in order to align interleaver components for more convenient packaging.

Additional features and advantages of the invention will be set forth in the description which follows, and in part will be obvious or apparent from the following detailed description and accompanying drawings, or may be learned by practicing of the invention. The features and advantages of the invention may be realized and obtained by means of the instruments and combinations particularly pointed out in the appended claims. These and other features of the present invention will become more fully apparent from the following description and appended claims, or may be learned by practicing of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 6A is an isometric view of a multi-cell implementation of the polarization beam splitting cell shown in FIG. 5A utilized in the embodiment of the optical interleaver shown in FIG. 3A.

FIGS. 6B-C show polarization diagrams for opposing ends of the polarization beam splitting cells shown in FIG. 6A.

FIG. 6E is a side elevation view of the variable coupling between cells of the multi-cell implementation shown in FIG. 6A.

FIG. 6F shows the individual transforms associated with each of the four delay paths on one of the two optical processing legs through the two cell sequence shown in FIG. 6A.

DETAILED DESCRIPTION OF THE PREFERRED EMBODIMENTS

Various optical interleavers, filter cells, and optical components are disclosed that can be used in a range of telecommunications an other applications including optical multiplexers/demultiplexers and optical routers. An example optical interleaver embodiment includes an optical processing loop which allows multi-stage performance characteristics to be achieved with a single physical filtration stage. Optical processing on the first leg and second leg of the loop improves the integrity of the optical signals by effecting complementary chromatic dispersion on the first and second legs.

Figure 1:
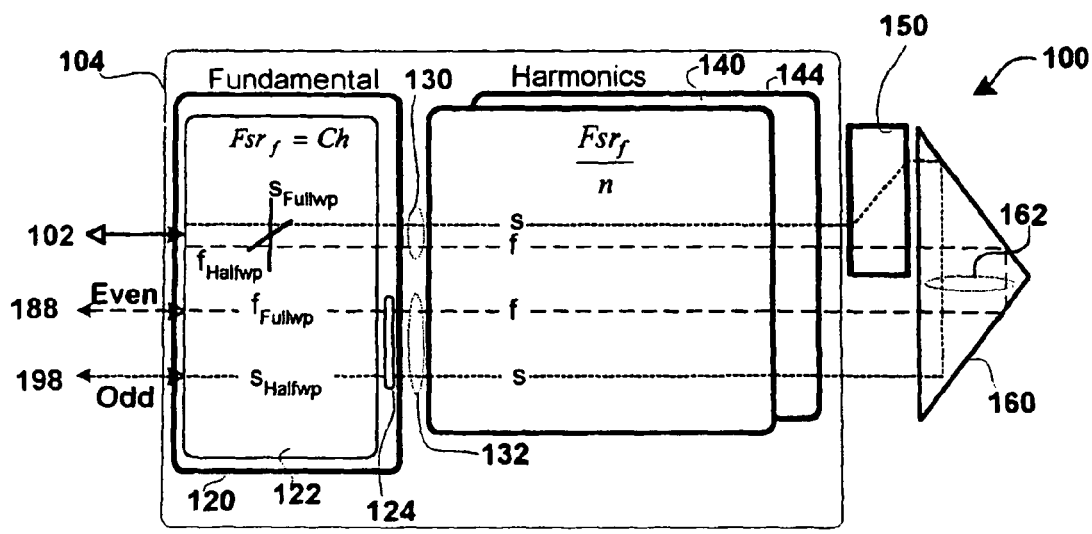
FIG. 1 is a hardware block diagram of an embodiment of an optical interleaver with an optical processing loop formed by a single physical stage coupled to an optical polarization beam displacer and retro reflector.

FIG. 1 is a hardware block diagram of an embodiment of an optical interleaver 100 with an optical processing loop 130, 162, 132 formed by a single stage 104 optically coupled to a splitter/combiner 150 and retro reflector 160. As used in this application, optically coupled should be interpreted broadly to encompass optical signal passing between two optical components directly, without any intervening optical components, as well as optical signals passing between two optical components using or through one or more intervening optical components. The interleaver is designed to operate on the narrowly spaced frequency division multiplexed channels of a telecommunications grid. These channels may be spaced apart in frequency at 50 GHz intervals or less. The interleaver can, depending on the propagation direction of an optical signal, split or combine an optical stream with 50 GHz channel spacing into two separate optical streams with odd and even 100 GHz channel spacing respectively and vice versa. The interleaver separates/combines optical signals, such as odd and even channel sets, with a higher degree of isolation and a lower dispersion than prior art designs. It may be used alone or in combination with other stages of similar or different design to separate out and/or route optical signals, such as each individual channel of a telecommunications or other communication grid. Although embodiments of the invention are described below in connection with odd and even channels sets for clarity, it should be appreciated that in general, embodiments of the invention may process arbitrary sets of one or more optical signals within a stream of (or interleaved with) one or more other optical signals.

In operation, as an optical demultiplexer for example, optical signals with both odd channels and even channels are injected into port 102 and are subject in stage 104 to a first stage of optical processing in leg 130 of the optical processing loop. The processed optical signals from leg 130 are split in splitter 150 into discrete optical signals with a corresponding one of an odd set of channels and an even set of channels and reflected by retro reflector 160 back to stage 104 for a second stage of optical processing in leg 132 of the optical processing loop. The resultant optical signals, one with odd channels and the other with the even channels, are output at the corresponding one of port 188, 198. Where the operations are reversed the optical interleaver 100 operates as an optical multiplexer combining discrete optical signals, one with odd channels and the other with even channels, input at ports 188, 198 into a single optical signal with both odd and even channels output at port 102.

Stage 104 includes a fundamental filter cell 120 and may include additional harmonic filters 140, 144. The filters are, in one embodiment of the invention, polarization filters which accept polarized optical signals and which split the input into orthogonal component vectors along a fast and a slow delay path. The optical pathlength difference between the fast and slow delay paths determines the periodic comb filter functions exhibited by the fundamental filter cell. The filters may be fabricated from a range of birefringent materials (see FIGS. 2A-B) or from the elements of a polarization beam splitting cell (see FIGS. 3A-B). The filters of stage 104 may be characterized with a Fourier series in which the fundamental filter cell provides fundamental comb filter functions and in which any additional harmonic filters impose higher order harmonics thereon.

The fundamental filter cell is designed with a first free spectral range (FSR) for optical signals propagating on the first leg 130 and a second FSR for optical signals propagating on the second leg 132 of the optical processing loop. The first and the second FSR are both substantially equal to the channel spacing between adjacent odd or even channels. The first and second FSR are also offset with respect to one another by an amount which effects phase shifts of odd integer multiples of substantially half a wavelength for each center wavelength associated with any of the channels, odd or even. This asymmetry improves the integrity of the optical signals by effecting complementary chromatic dispersion on the first and second legs.

The offset in FSR between the first and second legs of optical processing in the fundamental filter cell 120 is effected in the embodiment shown in FIG. 1 by a fundamental filter 122 optically coupled on one of the optical processing legs 126 128 with a zero-order half waveplate 124. In this embodiment of the invention the fundamental filter operates as a narrowband waveplate with an FSR on each of the legs which substantially corresponds with the spacing between adjacent odd or even channels. In this embodiment the fundamental filter operates as a narrowband full/half waveplate or half/full waveplate for the odd set of channels and the even set of channels. The zero-order half waveplate may be a discrete component or integrated with the fundamental filter. As a discrete component the zero-order half waveplate may be optically coupled with the fundamental filter on either side thereof. The zero-order half waveplate optically couples to the fundamental filter on one of the two legs of the optical loop. The zero-order half waveplate exhibits a second FSR which effects phase retardations of odd integer multiples of substantially half a wavelength for each center wavelength associated with the channels, odd or even.

The first and the second FSR of the fundamental filter cell each substantially corresponds with the periodic frequency spacing between adjacent odd or even channels, e.g. an odd channel and an adjacent odd channel. The optical path length difference between the two delay paths in the fundamental filter cell on either the first or the second leg, corresponds inversely with the free spectral range (FSR). This relationship is set forth in the following Equation 1a:

$$\text{Equation 1a: } FSR = \left(\frac{c}{|L_S - L_F|}\right)$$

where $L_S$ and $L_F$ are the total optical path length of each of the delay paths on either of the optical processing legs within the fundamental filter cell and c is the speed of light in a vacuum. Additional filters, e.g. 140, 144 may provide the harmonics required for establishing a flat top composite comb filter function for the interleaver such as that shown in FIG. 8E. The interleaver shows improvements in chromatic dispersion over prior art designs as a result of an optical pathlength shift and inversely corresponding FSR offset on the first and second optical processing leg within the fundamental filter cell 120.

Figure 7B:
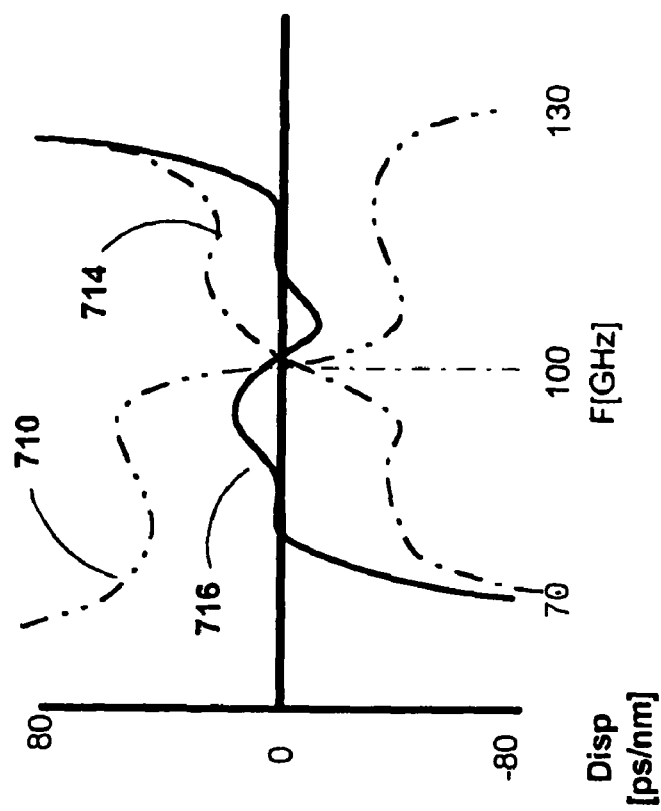
FIGS. 7A-B are graphs showing the complementary dispersions profiles about a representative center frequency of one of the channels.
Figure 7A:
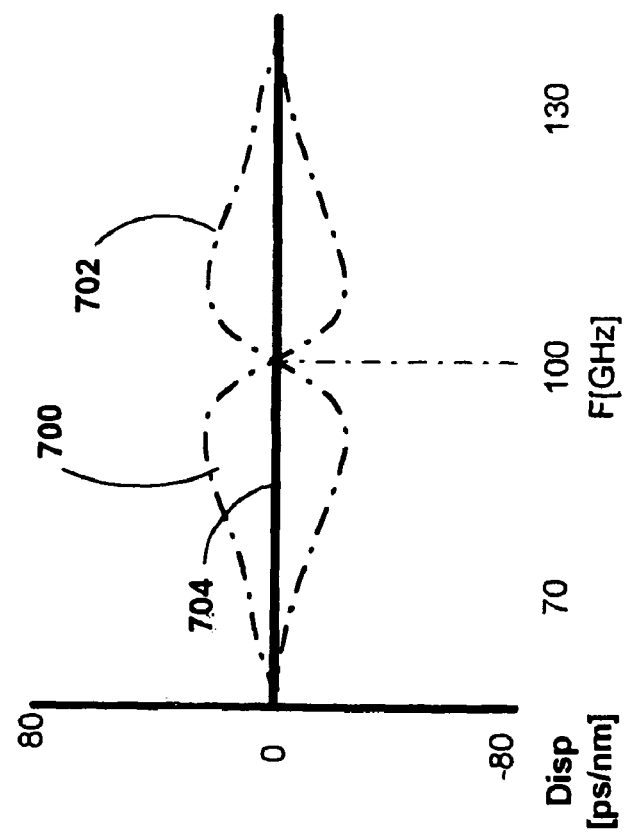

In the embodiment of the invention shown in FIG. 1, the fundamental filter cell includes the zero-order half waveplate filter portion 124 on one of the optical processing legs 130, 132. This zero-order half waveplate filter imposes a half wavelength phase retardation on both the odd and even channels. This zero-order half waveplate portion effects an optical pathlength difference in one of the optical processing legs with respect to the other within the fundamental filter cell. The optical pathlength difference corresponds with odd integer multiples of one-half of the wavelength of interest as shown in the following Equation 2:

$$\text{Equation 2: } OPD_{L1} + (2N+1)\left(\frac{\lambda}{2}\right) = OPD_{L2}$$

where $OPD_{L1}$ is the optical pathlength difference of the fundamental cell along one of the optical processing legs 130, 132 and $OPD_{L2}$ is the optical pathlength difference of the fundamental cell along the other of the optical processing legs 130, 132. This shift in optical pathlength difference and inversely corresponding offset in FSR on the two optical processing legs 103, 132 results in substantially complementary chromatic dispersion profiles along each of the optical processing legs, the net effect of which is a substantial reduction of chromatic dispersion and a concomitant improvement in signal integrity within each telecommunications channel as shown in FIGS. 7A-B. This shift is achieved with a negligible deviation, e.g. less than 0.3%, between the first and second FSR of the fundamental cell 110.

The FSR of the zero-order half waveplate is expressed in the following Equation 1b:

$$\text{Equation 1b: } FSR = \left(\frac{c}{|L_S - L_F|}\right) = \frac{v_c}{1/2 + m}$$

where $L_S$ and $L_F$ are the total optical path length on the fast and slow delay paths of the zero-order half waveplate, $v_c$ is the center frequency of a selected one of the odd or even channels and m is the integer order of the wavelength. The range of acceptable values for the order m depends on the number of channels, the overall bandwidth, and the center frequency of the center channel. Smaller values of order m correspond with more uniform the behavior of the zero-order half waveplate across all channels and smaller optical pathlengths. For a typical telecommunication application order m will be less than one-hundred and may be in the range of 1-10. For a channel spacing of 50 GHz the FSR of the zero-order half waveplate at a center frequency of 1550 nm and an order of "0" would be 2*c[nm]/1550 [nm] or approximately 386 THz which is at least two orders of magnitude greater then the FSR of the fundamental filter 122.

Figure 2A:
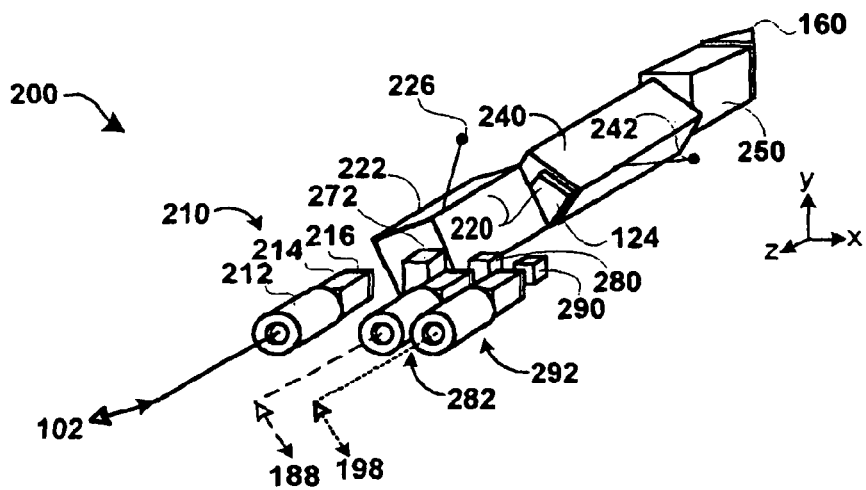
FIGS. 2A-B are isometric views of alternate embodiments of the optical interleaver shown in FIG. 1 with birefringent crystals forming the single physical filter stage.
Figure 2B:
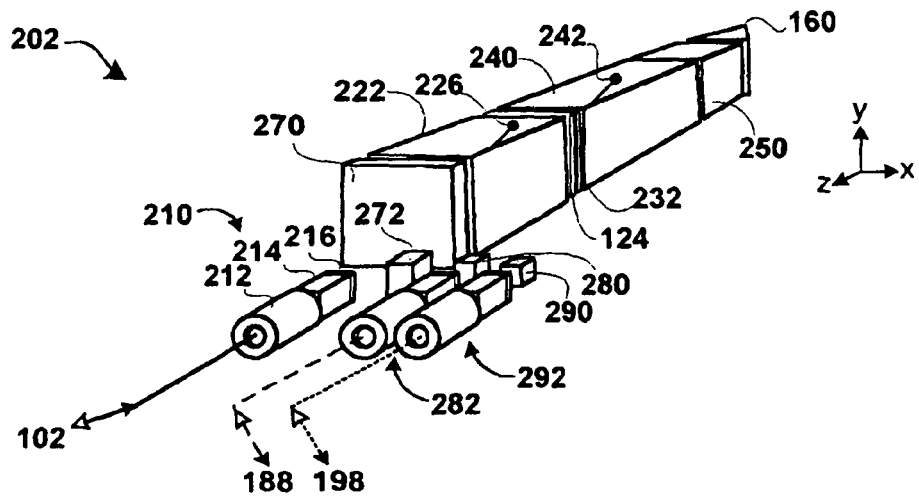

FIGS. 2A-B are isometric views of alternate embodiments of the optical interleaver shown in FIG. 1 with birefringent crystals forming the fundamental and harmonic filters of the single filter stage. The interleaver 200 has 3 ports 102, 188, 198 which couple with the fundamental filter cell 220 via corresponding port couplers 210, 282, 292 respectively. The port coupler 210 for port 102 includes: a collimator 212 with a lens, a beam splitter 214, and waveplates 216. In operation as an optical demultiplexer, an optical signal with odd and even channels modulated thereon enters collimator 212 via port 102 which may be an optical fiber. The lens for collimator 212 may be a Graded Index of Refraction (GRIN) or other lens system. The lens focuses/collimates light depending on the propagation direction to/from the beam splitter 214. The beam splitter may be fabricated from a birefringent crystal with an optic axis oriented to effect a walk-off of the optical signal onto waveplates 216. The waveplates are zero-order waveplates and have optical axis oriented to effect a linearization of the polarization vectors of the two rays formed by the beam splitter.

The linearly polarized rays are then introduced into the fundamental filter cell 220 which includes a fundamental filter 222 and a zero-order half waveplate 124. The fundamental filter operates as a narrowband full and half or half and full waveplate for the odd and even channels respectively. The angle of the polarization vector for the linearly polarized rays with respect to the optical axis 226 of the fundamental filter cell determines the coupling of the optical signal onto the fast and slow paths, e.g. the "e" and "o" rays in the fundamental filter. The harmonic filter cell 240 optically couples with the fundamental filter cell and imposes a higher order harmonic on the optical signals processed in the fundamental filter. The angle of the polarization vector for the linearly polarized rays from the fundamental cell with respect to the optical axis 242 of the harmonic filter cell determines the coupling of the optical signal onto the fast and slow paths, e.g. the extraordinary "e" and ordinary "o" rays in the harmonic filter cell.

The optical polarization beam splitter/combiner/displacer 250 splits the odd and even signal outputs on the first optical processing leg from the fundamental filter cell and the harmonic filter cell. The retro reflector 160 then couples these split optical signals back into the first stage, i.e. the harmonic filter cell 240 and the fundamental filter cell where they will be further isolated. The zero-order half waveplate 124 is optically coupled to the fundamental filter 222 on one of the optical processing legs to effect a substantial reduction of chromatic dispersion of the demultiplexed odd and even channels. The fundamental filter beam benders 272, 280, 290 direct optical signals with odd channels and optical signals with even channels to a corresponding one of the two output ports 188, 198 of the demultiplexer via an associated one of the port couplers 282, 292. In operation as a multiplexer the propagation path between the ports 198, 188 and port 102 is reversed.

In the above embodiment illustrated in FIG. 2A, the optical axis 226 of the fundamental cell and optical axis 242 of the harmonic cell are oriented perpendicular to each respective cell top surface. To form an angle between the polarization direction of the incident light and the optical axis to effect polarization beam splitting, the fundamental cell or the harmonic cell may be physically rotated with respect to the signal propagation direction as indicated in FIG. 2A, especially in the case which the polarization direction of incident light is vertically or horizontally polarized. In some cases, for ease of packaging and manufacturing, it is desirable to have the fundamental cell and the harmonic cell sit flat on a packaging platform. In such a case, the birefringent crystals in the fundamental cell or the harmonic cells can be cut in such a way that their respective optical axes 226 and 242 are oriented in predetermined angles with respect to the direction of their respective top surfaces, resulting in effective polarization beam splitting. Thus, physical rotations of the fundamental or harmonic cells are not required. Alternatively, if the optical axes of 226 and 242 remain orientated perpendicular to their respective cell top surfaces, zero-order waveplates can be inserted in front of the fundamental cell and the harmonic cell, leading to effective polarization beam splitting as explained below in connection with FIG. 2B.

FIG. 2B shows an alternate embodiment of the optical interleaver shown in FIG. 2A. In FIG. 2B the optical interleaver 202 includes zero-order waveplates 270, 232 which allow alignment of external features of the fundamental filter 222, the zero-order half waveplate 124 and the harmonic filter cell 240. Zero-order waveplate 270 allows external features, e.g. surfaces of the fundamental filter 222 and the zero-order half waveplate 124 to be aligned with the port couplers 210, 282, 292 via rotation of the optical signals entering and exiting the fundamental filter without effecting of the coupling ratio at which optical signals couple onto the fast and slow paths within the fundamental filter. Zero-order waveplate 232 allows external features e.g. surfaces of the harmonic filter 240 to be aligned with the fundamental filter 222 and the zero-order half waveplate 124 without effecting of the coupling ratio at which optical signals couple to/from the fast and slow paths of the fundamental filter and the harmonic filter.

Figure 3A:
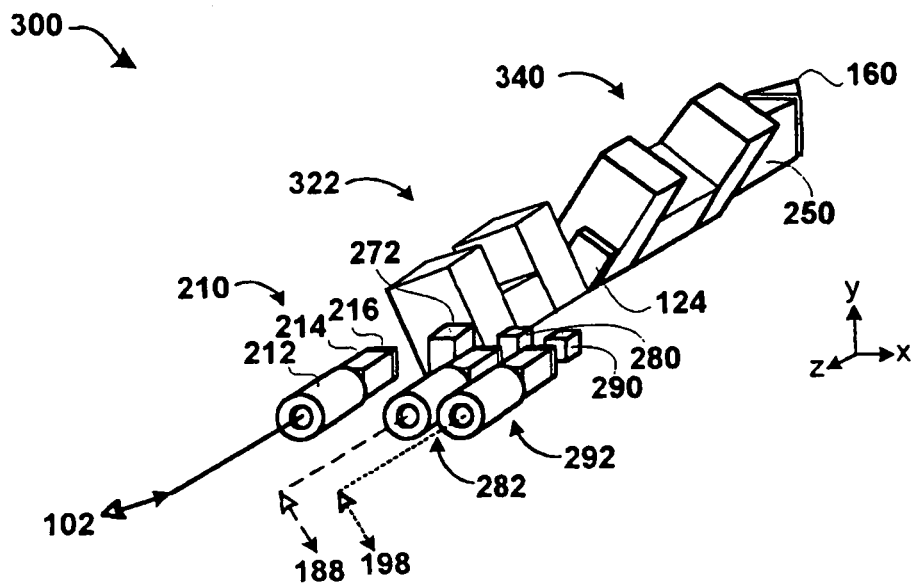
FIGS. 3A-B are isometric views of alternate embodiments of the optical interleaver shown in FIG. 2 with optical filter cells forming the single physical filter stage.
Figure 3B:
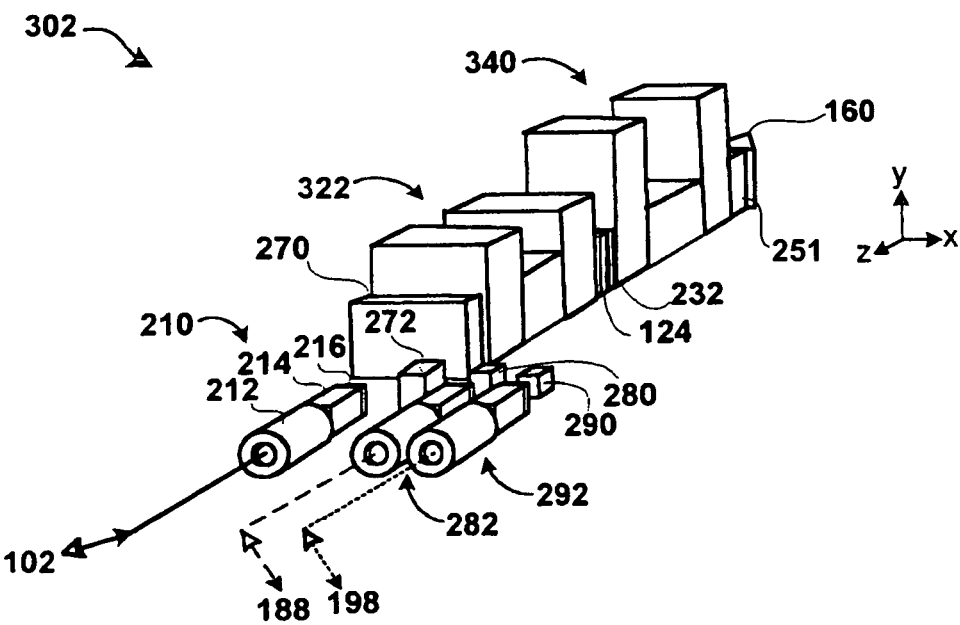

FIGS. 3A-B are isometric views of alternate embodiments 300 and 302 of the optical interleaver shown in FIGS. 2A-B with polarization beam splitting cells 322 and 340 and zero-order half waveplate 124 forming the single filter stage. These cells will be discussed in greater detail in the following FIGS. 4-6. In the embodiment shown in FIG. 3B external features of the polarization beam splitting cells 322, 340 and the zero-order half waveplate 124 may be aligned with the introduction of the zero-order waveplates 232, 270 discussed above in connection with FIG. 2B.

Figures 4A, 4B, 4C:
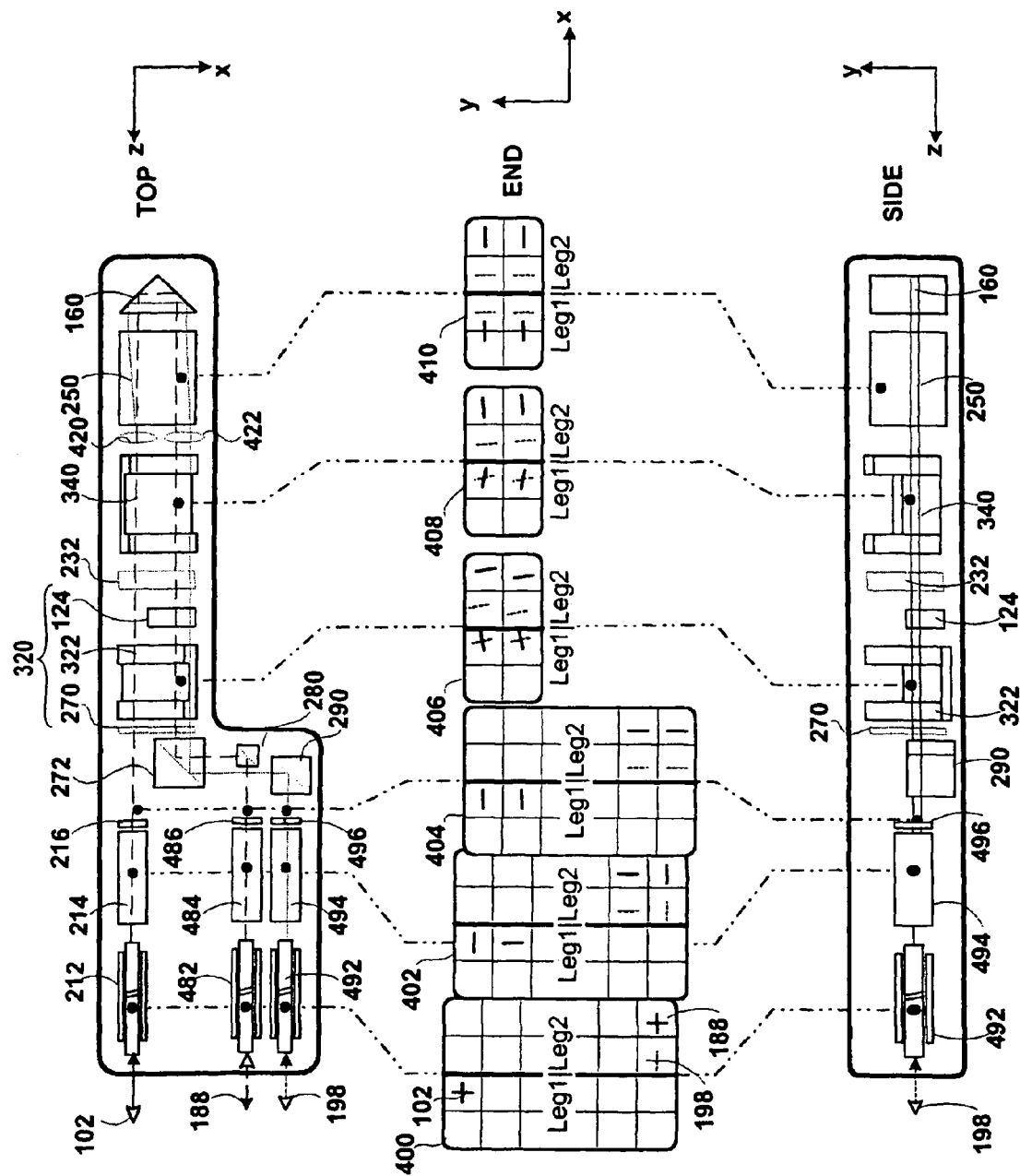
FIG. 4A and FIG. 4C are top and side hardware block views of the embodiment of the optical interleaver shown in FIG. 3A.
FIG. 4B is a polarization diagram showing polarization vectors along the two legs of the optical processing loop formed within the embodiment of the optical interleaver shown in FIG. 3A.

FIG. 4A and FIG. 4C are top and side hardware block views of the embodiment of the optical interleaver shown in FIG. 3A. The polarization beam splitting cells shown in FIGS. 5-6 form the fundamental and harmonic filters of the single filter stage. The interleaver has 3 ports 102, 188, 198 which couple with the fundamental filter cell 322 via corresponding port couplers. The port coupler for port 102 includes: collimator 212 with a lens, beam splitter/combiner 214, and waveplates 216. The port coupler for port 188 includes: collimator 482 with a lens, beam splitter/combiner 484, and waveplates 486. The port coupler for port 198 includes: collimator 492 with a lens, beam splitter/combiner 494 and waveplates 496. In operation as an optical demultiplexer an optical signal with odd and even channels modulated thereon enters collimator 212 via port 102 which may be an optical fiber. The lens for collimator 212 may be a Graded Index of Refraction (GRIN) or other lens system. The lens focuses/collimates light depending on the propagation direction to/from the beam splitter/combiner 214. The beam splitter/combiner may be fabricated from a birefringent crystal with an optic axis oriented to effect a walk-off of the optical signal onto waveplates 216. The waveplates are zero-order waveplates and have their optical axis oriented to effect a linearization of the polarization vectors of the two rays formed by the beam splitter/combiner.

The linearly polarized rays are then introduced into the fundamental filter cell which includes a polarization beam splitting cell 322 which operates as the fundamental filter and a zero-order half waveplate 124. In the embodiment shown, the fundamental filter operates as a narrowband full/half waveplate or half/full waveplate for the odd set of channels and the even set of channels. The angle of the polarization vector for the linearly polarized rays with respect to the polarization axis (see FIG. 5) of the fundamental filter cell determines the coupling of the optical signal onto the fast and slow paths in the fundamental filter cell. The harmonic filter cell 340 optically couples with the fundamental filter cell and imposes a higher order harmonic on the optical signals processed in the fundamental filter. The angle of the polarization vector for the linearly polarized rays from the fundamental cell with respect to the polarization axis of the harmonic filter cell determines the coupling of the optical signal onto the fast and slow paths in the harmonic filter cell. The optical polarization beam displacer, polarization beam displacer 251, splits the odd and even signal outputs on the first optical processing leg 420 from the fundamental filter cell and the harmonic filter cell. Polarization beam displacer 251 is described in greater below with respect to FIGS. 5M and 5N.

The retro reflector 160 then couples these split optical signals onto the second optical processing leg 422 back into the first stage, i.e. the harmonic filter cell 240 and the fundamental filter cell where they will be further isolated. The beam splitter/combiner 250 may intersect either or both of the optical processing legs 420, 422. The zero-order half waveplate 124 is optically coupled to the fundamental filter 322 on one of the optical processing legs, e.g. the optical processing leg 422, to effect a substantial reduction of chromatic dispersion of the demultiplexed odd and even channels. In an alternate embodiment of the invention the zero-order half waveplate may be integrated with the fundamental filter, on either of the optical processing legs 420, 422. The fundamental filter beam benders 272 directs both odd and even channel optical signal outputs to corresponding ones of beam benders 280 and 290 for redirection via the corresponding port coupler components 482-486 and 492-496 to the corresponding port 188 and 198 respectively. In operation as a multiplexer the propagation path between the ports 198, 188 and port 102 is reversed. FIGS. 4A and 4C also show in dashed lines the zero-order waveplates 232 and 270 which allow the alignment of external features of the port couplers, fundamental filter cell and harmonic filter as shown in FIG. 3B.

FIG. 4B is a polarization diagram showing polarization vectors along the first and second leg 420, 422 respectively of the optical processing loop formed within the embodiment of the optical interleaver shown in FIG. 3A. The polarization diagrams are shown in views at various locations along the z-axis looking in the negative z direction. Polarization diagram 400 corresponds with the polarization states within the lenses of collimators 212, 482, and 492 for the polarization vectors for the optical signals entering/exiting ports 102, 188, and 198 respectively. Polarization diagram 402 corresponds with the polarization states within the beam splitter/combiners 214, 484 and 494 for the polarization vectors for the optical signals entering/exiting ports 102 188, and 198 respectively. Polarization diagram 404 corresponds with the polarization states within the waveplates 216, 486, and 496. Polarization diagram 406 corresponds with the polarization states within the fundamental filter 320 on the first and second optical processing legs 420, 422. Polarization diagram 408 corresponds with the polarization states within the fundamental filter 340 on the first and second optical processing legs 420, 422. Polarization diagram 410 corresponds with the polarization states within the splitter/combiner 250 on the first and second optical processing legs 420, 422.

Figure 5A:
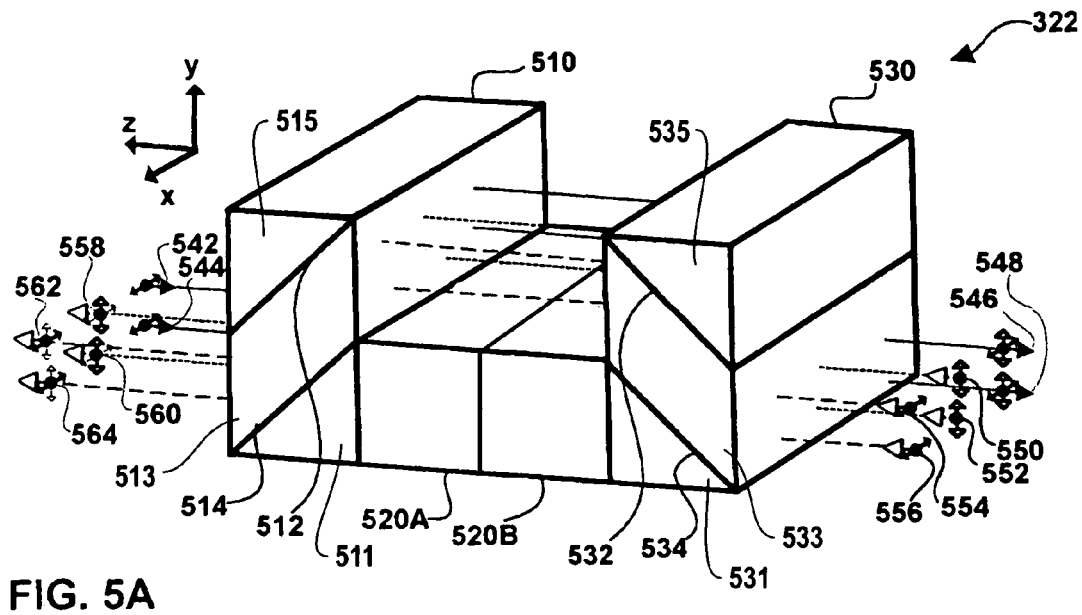
FIG. 5A is an isometric view of a polarization beam splitting cell utilized in the embodiment of the optical interleaver shown in FIGS. 3A-B with polarization dependent beam splitters linked by a pair of delay paths.

FIG. 5A is an isometric view of a polarization beam splitting cell utilized in the embodiment of the optical interleaver shown in FIGS. 3A-B. The optical filter cell employs couplers with polarization dependent beam splitting to couple light onto a pair of delay paths. This polarization beam splitting cell is utilized in the embodiments of the invention shown in FIGS. 3A-B and 4A-B to form the fundamental filter 322 and the harmonic filters 340. The optical filter cell includes couplers employing polarization dependent beam splitting between a pair of delay paths. Each coupler transmits and reflects light depending on the input properties of the light. In the embodiment of the invention shown in FIG. 5A, each coupler is polarization sensitive and includes "P" and "S" polarization axes orthogonal to one another. A first coupler is positioned in the propagation path of incoming polarized light and transmits and reflects components of incoming polarized light aligned with the "P" and "S" polarization axis of the coupler respectively. Light transmitted and reflected by the coupler follows two distinct delay paths, one for transmitted light and the other for reflected light. Where incoming light is orthogonally polarized, the first coupler provides configurable amounts of coupling and cross-coupling of each of the orthogonal polarization vectors of the incoming light with either of the pair of delay paths. A second coupler positioned at a location where the two distinct delay paths intersect reverses the process and re-aligns light with orthogonal polarization vectors onto a common propagation axis.

The polarization beam splitting cell 322 is shown within an "x, y, z" or Cartesian coordinate system. The cell includes opposing optical polarization beam splitters 510, 530 displaced from one another along the z-axis with the optical element(s) 520A-B covering the span between the splitters. Polarization beam splitter 510 is shown with a reflector 512 and a polarization dependent beam splitter 514 displaced from each other in a direction defined by the y-axis. Polarization beam splitter 530 is shown with a reflector 532 and a polarization dependent beam splitter 534 displaced from each other in a direction also defined by the y-axis. The polarization dependent beam splitters have "S" polarization axes which are aligned, in the orientation of the cell that is shown, parallel with the x-axis. The "P" polarization axis of each polarization dependent beam splitter is orthogonal to the "S" axis, i.e. aligned parallel with the y-axis. It should be noted that reflectors 512, 532 and polarization dependent beam splitters 514, 534 need not be at 45 degree angles with respect to incident optical signals, and in many implementations are at other angles, usually larger than 45 degrees. In some example embodiments, reflectors 512, 532 and polarization dependent beam splitters 514, 534 are at an angle of approximately 55 degrees with respect to the incident optical signals, but a wide range of angles are possible depending on the particular implementation.

Each polarization beam splitter 510, 530 may be fabricated from two pairs of prisms (not shown). In this case, polarization beam splitter 510 and the polarization dependent beam splitter 514 may be formed from a first pair of prisms at right or other complementary angles to one another. These may be affixed to one another, e.g. cemented, to minimize wave front distortion. The hypotenuse of one of the prisms is coated with a multi-layer dielectric polarizing beam splitter coating. The prisms are then affixed to one another, to form a first rectangle, the exterior surfaces of which may be antireflection (AR) coated to minimize surface reflection losses. A second pair of prisms may be used to form the reflector 512. The hypotenuse of one of this second pair of prisms is coated with a reflective dielectric coating, and cemented to the hypotenuse of the other of the second pair of prisms to form a second rectangle, the exterior surfaces of which may also be AR coated. The two rectangles formed by the two pairs of prisms may then be affixed to one another to form the polarization beam splitter 510. A similar technique may be used to fabricate the second polarization beam splitter 530.

Alternatively, polarization beam splitter 510, 530 may be fabricated from two prisms 511, 515 or 531, 535 and a parallel plate 513, 533 at right or other complementary angles to one another. The surface of the parallel plate that forms polarization dependent beam splitter 514 may be coated with a multi-layer dielectric polarizing beam splitter coating. The surface of the parallel plate that forms reflector 512 also may be coated with a multi-layer dielectric polarizing beam splitter coating or simply may be coated with a reflective dielectric coating. In other embodiments, the surfaces of the prisms that affix to the parallel plate may be coated with the appropriate coating. It should be appreciated that the prism attached to reflector 512 may be omitted if the parallel plate, as opposed to prism, is coated with the multi-layer dielectric polarizing beam splitter or reflective coating. The parallel plate and prisms may be affixed to one another with an optical bond (i.e., optical contact, epoxy free), and the exterior surfaces of polarization beam splitter 510 AR coated to minimize surface reflection losses. A similar technique may be used to fabricate the second polarization beam splitter 530.

Other variations on the cell are discussed in U.S. patent application Ser. No. 09/944,037 filed on Aug. 31, 2001 and entitled: "METHOD AND APPARATUS FOR AN OPTICAL FILTER" as well as U.S. patent application Ser. No. 09/879,026 filed on Jun. 11, 2001 and entitled: "METHOD AND APPARATUS FOR AN OPTICAL FILTER."

In FIG. 5A the optical signals associated with the first and second legs of the optical loop are shown. Beams 542, 544 are shown propagating through the filter cell along the first leg of the optical loop and exiting the filter cell as beams 546, 548 respectively. Their polarization states on entry and exit from the fundamental cell are shown in FIGS. 5D-5E respectively. Beams 550, 552, 554, 556 are shown propagating through the filter cell in the opposite direction along the second leg of the optical loop and exiting the filter cell as beams 558, 560 562 564 respectively. Their polarization states on entry and exit from the fundamental cell are shown in FIGS. 5D-5E respectively. The cell filters light bi-directionally. For purposes of illustration polarized light is shown entering the cell in a negative direction along the z-axis on the first leg of the optical processing loop and in a positive direction along the z-axis on the second leg of the optical processing loop. Propagation in the opposite direction is also supported. The cell is also highly directional so that light propagating in one direction is independent of the light propagating in the reverse direction.

Figure 5B:
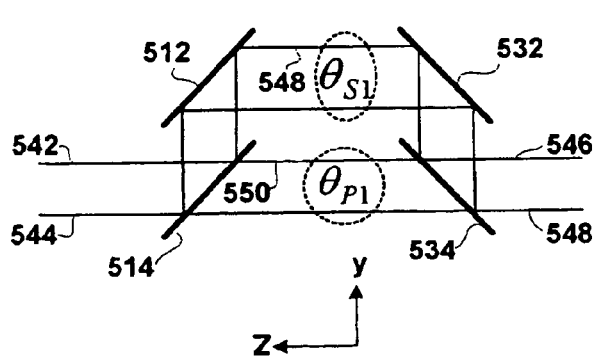
FIG. 5B shows the fast and slow delay paths within the cell shown in FIG. 5A.

FIG. 5B shows the fast and slow delay paths $\theta_{P1}$ and $\theta_{S1}$ within the polarization beam splitting cell shown in FIG. 5A. Beam 542 is split by beam splitter 514 into a pair of slow/fast delay paths 548, 550. Reflectors 512, 532 reflect the optical signals on delay path 548 back to the splitter 534 where they are recombined with the optical signals on delay path 550. Similar optical processing is applied to beam 544. The amount of delay on the P and S delay paths are $\theta_{P1}$ and $f_{S1}$ respectively. The delay of each path is determined by its corresponding optical path length. The optical path length of each path is the sum of the product of physical dimension and the index of refraction of all the optical elements on each of the two distinct S and P delay paths 548, 550 respectively. Optical element(s) 520A-B cover the span between the splitters on the P delay paths. These optical elements have a different optical pathlength than the optical elements, solid, liquid, gas, plasma, which make up the S path. The delay difference for the cell is proportional to the difference in the optical path lengths between the P and S delay paths. The delay difference exhibits itself in the optical properties of the output beam 546. That output beam exhibits the interference pattern produced by the re-coupling of the P and S delay paths by the second of the polarization beam splitters 534 into a single output beam.

The output beam includes orthogonal polarization vectors shown with a square and a circle. Each contains complementary periodic stop bands and pass bands of the other with center wavelengths the spacing between which is inversely related to the delay difference between the P and S delay paths. In other words the larger the delay difference the smaller the wavelength spacing which the optical filter cell can resolve.

Figure 5C:
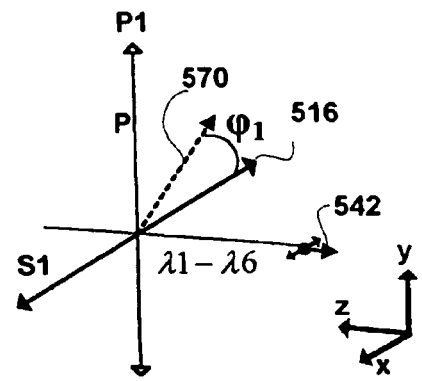
FIG. 5C is an isometric view of a linearly polarized optical signal in relation to the polarization axis of the polarization beam splitting cell shown in FIG. 5A.
Figure 5D:
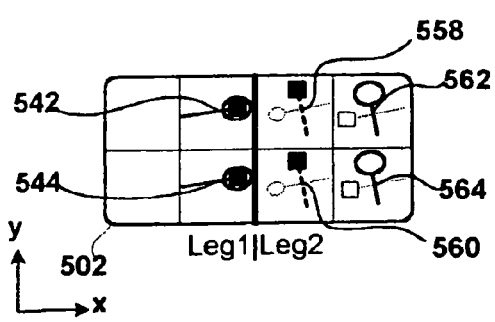
FIGS. 5D-E show polarization diagrams for opposing sides of the polarization beam splitting cell shown in FIG. 5A.
Figure 5E:
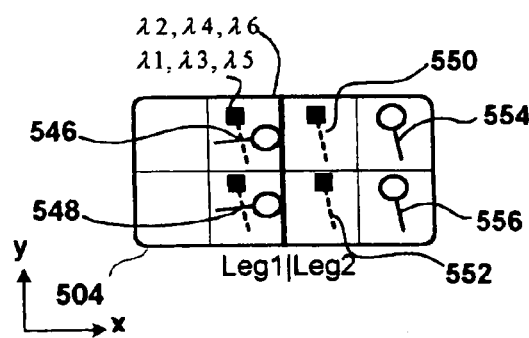

FIG. 5C is an isometric view of a linearly polarized optical signal in relation to the polarization axis of the polarization beam splitting cell shown in FIG. 5A. Polarized light from beam 542 for example, will couple with both the P and S axis of the coupler 514, a polarization beam splitter, in amounts which corresponded with the relative angular rotation between the polarization vector(s) of the polarized input and the orthogonal P and S polarization axis of the beam splitter. The component of a polarized input which projects onto the S polarization axis of the beam splitter will be reflected by the beam splitter. The component of a polarized input which projects onto the P polarization axis of the beam splitter will be transmitted by the beam splitter.

The polarized light beam 542 may be arbitrarily, circularly or linearly polarized. In the example shown, beam 542 is linearly polarized with a polarization vector 570 at an angle $\phi_i$ with respect to the "S1" polarization axis 516 of the cell. As the beam 542 enters the cell it is accepted onto either of two distinct S and P delay paths 548, 550 respectively. These delay paths link the polarization dependent beam splitters 514, 534. The amount of light that is coupled onto either delay path is determined by the angle $\phi_1$ of the incoming beam vector with respect to the S polarization axis of the cell.

In the example shown, light from polarization vector 570 in amounts proportionate to $\sin^2(\phi_1)$ and $\cos^2(\phi_1)$ will couple to the P and S delay paths respectively. Rotation of the cell about the propagation path, e.g. the z-axis, of the beam 542 can be used to vary the coupling percentages or ratios between the incoming light and the P and S delay paths. Similar considerations apply for beams 550-556 on the second leg of the optical processing loop. Where incoming light includes orthogonal polarization vectors the coupling of either vector will be determined by projecting that vector onto the P and S polarization axis of the polarization beam splitter as well. The polarization beam splitters 514, 534 thus serve as couplers which provide configurable amounts of coupling and cross-coupling of incoming beams with either of the pair of delay paths.

FIGS. 5D-E show polarization diagrams for opposing sides of the polarization beam splitting cell shown in FIG. 5A. Polarization diagram 502 shows an embodiment of the possible polarization states for beams 542, 544 entering the filter on the first leg of the optical loop and for beams 558, 562 exiting the filter from the second leg of the optical loop. Polarization diagram 504 shows representative polarization states for beams 546, 548 exiting the filter on the first leg, and for beams 552, 556 entering the filter on the second leg of the optical loop. The optical polarization beam splitter/displacer and retro reflector which form the optical loop between the first and second legs are not shown (see FIGS. 3A-B). The vector with a square at the end contains pass bands with center wavelengths at odd integer multiples of the periodic interval established by the delay difference between the delay paths in the filter. The vector with a circle at the end contains pass bands with center wavelengths at even integer multiples of the periodic interval established by the delay difference between the delay paths in the filter.

Beam 542 enters the first leg with multiplexed odd and even channels, and exits the filter with the odd and even channels demultiplexed onto corresponding one of the two orthogonal output vectors which make up beam 546. The optical polarization beam splitter/combiner/displacer 250, 251 (see FIGS. 3A-B) splits these orthogonal component vectors into beams 550, 554 which are reflected by retro reflector 160 (see FIGS. 3A-B) and passed along the second leg of the optical processing leg including the portion of the second leg which intersects filter cell 322. On the second pass through the fundamental cell provided by the second leg any vestigial odd components in the even channels and even components for the odd channels are removed.

Without an offset in the FSR of the portion of the first and second legs of the optical loop which intersect the fundamental filter cell, chromatic dispersion will be additive rather than complementary. Complementary chromatic dispersions on the first and second legs are desirable because they improve signal integrity. The amount of improvement in signal integrity is determined by the extent to which dispersions are at any frequency of equal and opposite sign (see FIGS. 7 A-B). The offset in FSRs may be achieved by coupling the cell 322 with a zero-order waveplate as shown in FIGS. 3A-B or within the polarization beam splitting cell 322 itself. In the former case the polarization beam splitting cell and a zero-order half waveplate make up the fundamental filter cell. The polarization beam splitting cell is the fundamental filter portion of the fundamental filter cell and operates as a narrowband full/half or half/full waveplate for the odd and even channels respectively. The zero-order waveplate completes the fundamental filter cell by coupling with the fundamental filter on one of the two legs of the optical loop and effecting phase retardations of odd integer multiples of substantially half a wavelength for each center wavelength of a corresponding channel in both the odd odd set of channels and the even set of channels. In the latter case the fundamental filter and the zero-order half waveplate are integrated with one another in a single polarization beam splitting cell. In this embodiment of the invention, the optical element(s) 520A-B which cover the span between the polarization beam splitters exhibit optical path lengths, the difference of which on the first and second legs results in the phase retardations of odd integer multiples of substantially half a wavelength for each center wavelength of a corresponding channel in both the odd set of channels and the even set of channels.

Like many broadband optical components, the polarization beam splitting cell of FIG. 5A introduces some chromatic dispersion in the optical signals that pass through it. Chromatic dispersion relates to pulse broadening within an optical signal, usually due to a wavelength dependence on the velocity of light. Accordingly, the amount of chromatic dispersion generally depends on the distance an optical signal travels. However, given its relatively small size, within polarization beam splitting cell 322 the primary source of chromatic dispersion is from certain optical components behaving like a Fabry-Perot (F-P) cavity, as illustrated by F-P cavity 572 in FIG. 5F.

F-P cavity 572 is defined by two parallel reflective surfaces R, separated by a material of length L with an index of refraction n. Generally, the reflectivity of each reflective surface for an F-P cavity is such that approximately 95 percent of the incident light, $I_o$, is reflected and about 5 percent is transmitted, $I_t$, independent of wavelength. For most wavelengths, the F-P cavity itself is also highly reflective. However, for certain wavelengths, the F-P cavity becomes highly transmissive (approaching 100 percent of the incident light). For light traveling perpendicular to the F-P cavity, this high transmission occurs when the separation between the reflective surfaces equals an integral number of half-wavelengths, and the F-P cavity is therefore resonant (i.e., the waves entering, leaving, and bouncing back and forth within the cavity are all in phase). Note in FIG. 5F that the reflected optical signals are shown offset from the transmitted signal simply to make the reflections visible for purposes of illustration. In practice, for an optical signal normal to the mirror surfaces, the transmitted and reflected optical signals essentially occupy the same region, i.e., they overlap and interfere with each other.

The separation between neighboring transmitted frequencies, also known as the FSR of the F-P cavity, is given by Equation 3a:

$$\text{Equation 3a: } FSR = \Delta\sigma = \frac{c}{2nL}$$

where c is the speed of light in a vacuum, n is the index of refraction for the material between the reflectors, and L is the separation between reflectors.

Figure 5F:
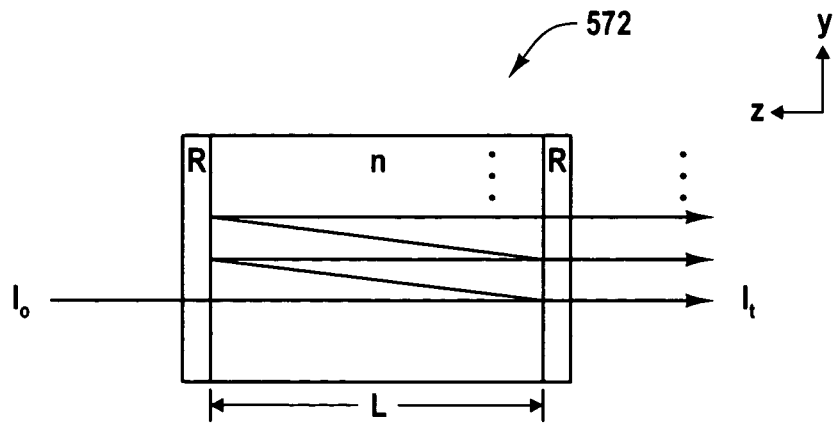
FIG. 5F is a block diagram of a Fabry-Perot Cavity model for characterizing one source of chromatic dispersion within optical components.

Reflection within the F-P cavity causes chromatic dispersion because the optical signals interfere with each other. As shown in FIG. 5F, the transmitted signal includes a transmitted portion of the incident signal, a transmitted portion of a reflection of the incident signal, and so on. Even though the intensity of each reflected signal tends to be much less than the intensity of the transmitted signal, the interference introduced by the reflected signals nevertheless leads to chromatic dispersion. The chromatic dispersion introduced by F-P cavity 572 is given by Equation 3b:

$$\text{Equation 3b: } CD = \frac{\partial \tau}{\partial \lambda} = \frac{2\pi}{c}\left(\frac{2nL}{\lambda}\right)^2 R \sin\left(\frac{2\pi}{\lambda}2nL\right)$$

where $\tau$ is the beam halfwidth at the 1/e point. Note that the chromatic dispersion is proportional to the square of the cavity length.

Of course, unlike F-P cavity 572, polarization beam splitting cell 322 is designed to transmit, rather then reflect, optical signals. Accordingly, adjoining surfaces within polarization beam splitting cell 322 generally are coated with an antireflective (AR) coating. In practice, however, it is not possible and/or economical to achieve an antireflective coating that is 100 percent effective, particularly for all wavelengths of a broadband signal. Therefore, while steps may be taken to reduce reflection between adjoining polarization beam splitting cell surfaces, some amount of reflection occurs.

Figure 5G:
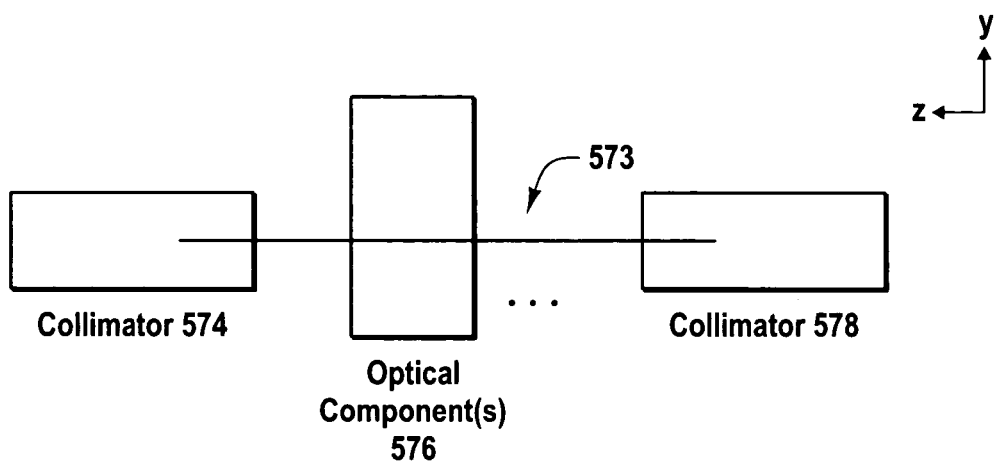
FIG. 5G is a generalized block diagram of an optical signal passing between two collimators through one or more optical components.

For example, with reference to FIG. 5A, polarization beam splitters 510, 530, optical element(s) 520A-B, and the span between the splitters 510, 530 each may behave to some degree like F-P cavity 572, and therefore introduce some amount of chromatic dispersion. The chromatic dispersion introduced by polarization beam splitting cell 322 may be explained more generally in connection with FIG. 5G. FIG. 5G shows an optical signal 573 that is transmitted between two collimators 574, 578. As the signal travels between the collimators, it passes through one or more optical components 576 for some type of optical processing. Similar to polarization beam splitters 510, 530, optical element(s) 520A-B, and the span between the splitters 510, 530 in the polarization beam splitting cell 322 of FIG. 5A, optical component(s) 576 may behave to some extent like F-P cavities and thus introduce chromatic dispersion into optical signal 573.

As indicated above in Equation 3b, the chromatic dispersion introduced by an F-P cavity depends on the wavelength of the optical signal passing through the cavity. Accordingly, for a broadband signal, the amount of chromatic dispersion introduced by polarization beam splitting cell 322 varies by wavelength. The overall variation in chromatic dispersion—the difference between the maximum chromatic dispersion and the minimum chromatic dispersion across the frequency band of the optical signal—is known as chromatic dispersion ripple (CD ripple). Accounting for chromatic dispersion is a relatively complex task in and of itself—variations in chromatic dispersion or CD ripple make the task of accounting or correcting for chromatic dispersion somewhat more complex. Furthermore, reductions in CD ripple generally correlate to reductions in the underlying chromatic dispersion itself. Accordingly, CD ripple is one factor to consider in evaluating the quality of an optical signal and optical components, and reducing CD ripple is one way to improve optical signal quality.

Figure 5H:
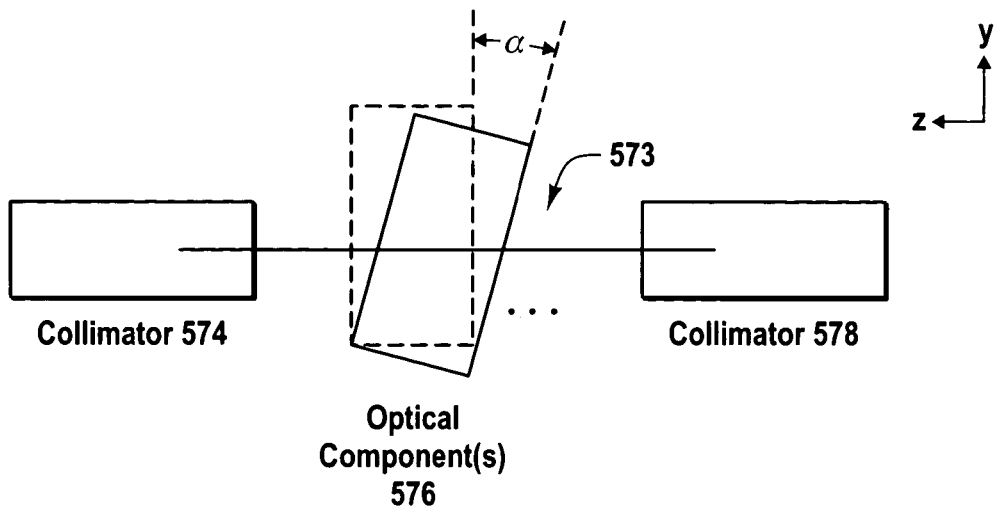
FIG. 5H shows the generalized block diagram of FIG. 5G with one of the optical components titled at an angle from normal with respect to the optical signal and two collimators.
Figure 5I:
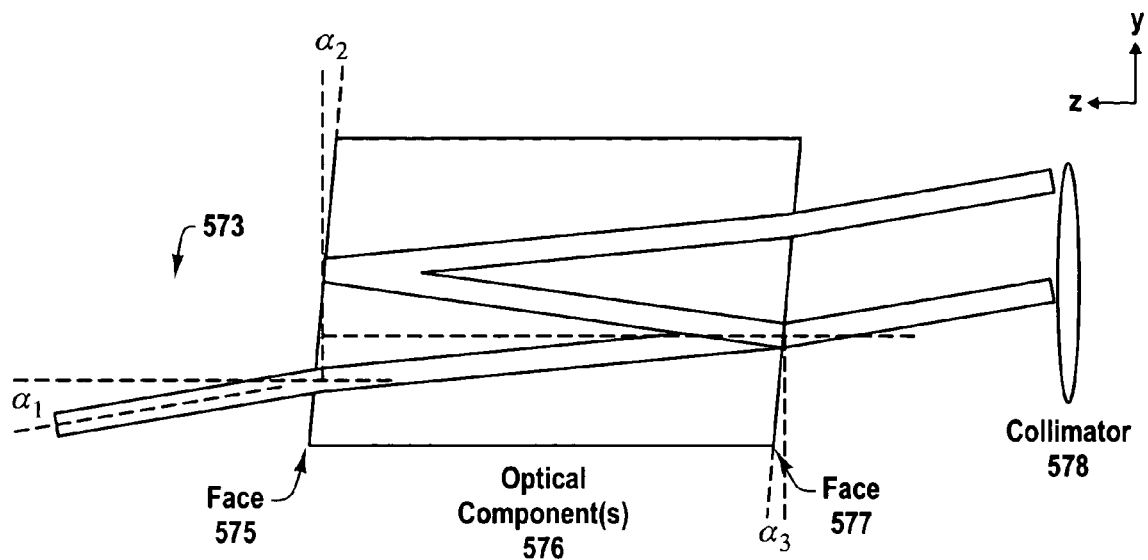
FIG. 5I shows an example path for an optical signal titled at an angle from normal, and a reflection of the optical signal, when passing through an optical component, also titled at an angle from normal, prior to reaching a collimator.

As shown in FIG. 5H, an angle, $\alpha$, relative to optical signal 573 may be introduced in one or more of the optical component(s) 576 between collimator 574 and collimator 578. The impact on optical signal 573 from effectively introducing an angle $\alpha$ is illustrated more specifically in FIGS. 5I-J. Upon exiting optical component 576, the transmitted portion of optical signal 573 reaches the center of collimator 578. The transmitted portion of the reflection of the incident signal 573, however, is offset from the center of collimator 578 and therefore contributes less to (interferes to a lesser degree with) the collimated optical signal leaving collimator 578. Note that the effective angle $\alpha$ may depend on a variety of factors including the angle of the incident optical signal ($\alpha_1$), the angle of the face 575 ($\alpha_2$), and the angle of face 577 ($\alpha_3$), in relation to optical component 576 and other external optical components.

Figure 5J:
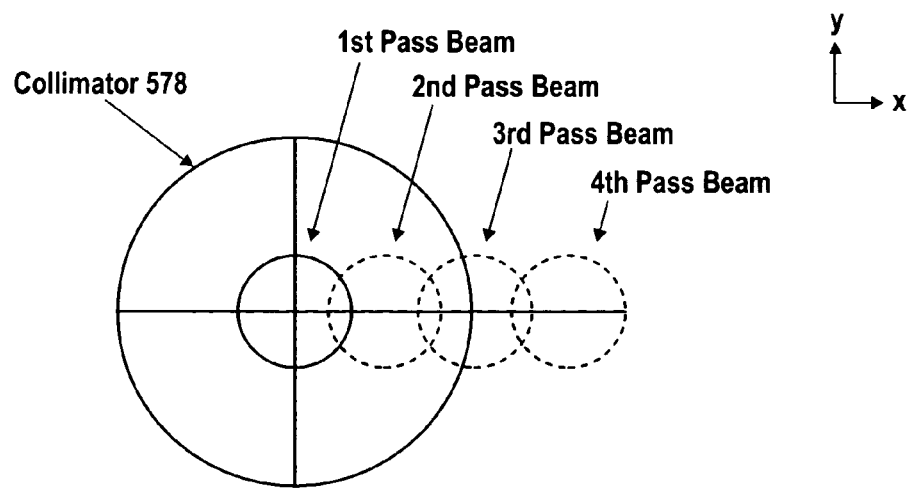
FIG. 5J shows an example path for an optical signal, and various reflections of the optical signal, from the perspective of a collimator when the optical signal passes through an optical component titled at an angle from normal prior to reaching the collimator.

FIG. 5J shows that the impact of the angle α on each successive beam pass (the transmitted portions of successive reflections) increases. The first pass beam strikes the center of collimator 578, the second pass beam is somewhat off-center, the third pass beam partially misses collimator 578, and the fourth pass beam misses the collimator entirely. The amount of offset introduced in each pass depends on the effective angle α and the length of the optical component 576.

Figure 5K:
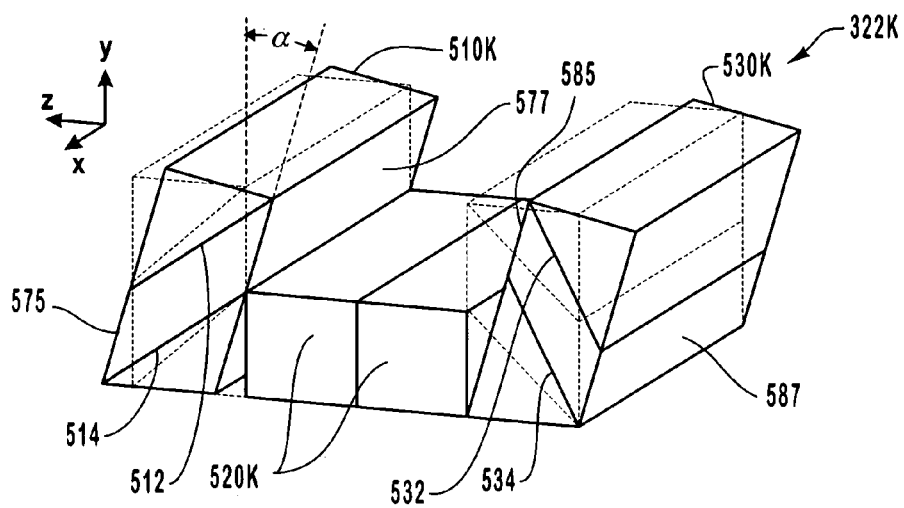
FIG. 5K shows an isometric view of an example polarization beam splitting cell with tilted polarization beam splitters.
Figure 5L:
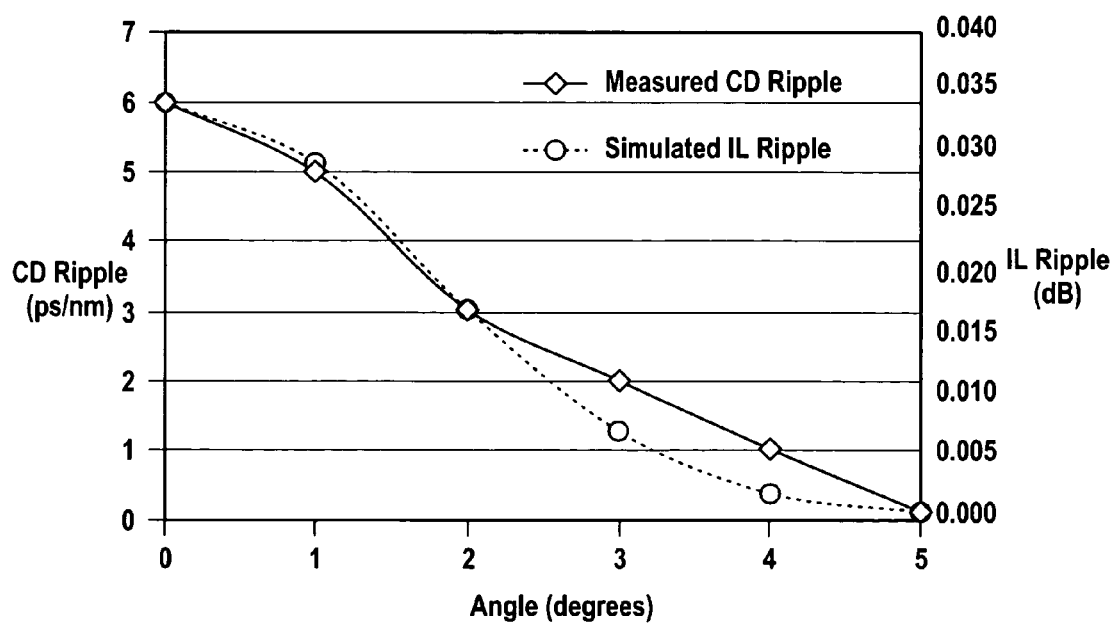
FIG. 5L is a graph illustrating the tilting angle dependence of chromatic dispersion ripple for the example polarization beam splitting cell of FIG. 5K.

Recalling for a moment basic principles of optics, the angle of incidence is equal to the angle of reflection. Note that in FIG. 5I, the angle of optical signal 573 changes at the boundaries of optical component 576 from refractive index changes. Note further that in FIGS. 5H, 5I, and 5K, the angles have been exaggerated to make the presence of an angle more apparent. Typical values for the effective angle α, such as in connection with the polarization beam splitting cell 322K illustrated of FIG. 5K, are shown by the graph depicted in FIG. 5L. The graph also includes an axis showing simulated insertion loss ripple (IL ripple)—the difference measured in dB between the maximum insertion loss and the minimum insertion loss across the frequency band of the optical signal—for polarization beam splitting cell 322K.

Because CD ripple is proportional to the square of the angle α, relatively small angles tend to produce little effect (i.e., do not significantly reduce CD ripple). On the other hand, relatively large angles lead to manufacturing problems, particularly with respect to antireflective coatings, and can cause a significant reduction in clear aperture. Accordingly, in one embodiment the angle α falls in a range from approximately 2.5 degrees to approximately 3.0 degrees. Of course, the most appropriate value for the angle α generally depends on the particular application of an optical device, such as collimators 574, 578, optical component(s) 576 or polarization beam splitting cell 322K, and the wavelength of the optical signal. Accordingly, an angle α as large as 5 degrees or more may be appropriate or desirable.

FIG. 5K shows polarization beam splitting cell 322K with polarization beam splitters 510K, 530K making an angle α with respect to optical elements 520K and with one or more incident optical signals—such as those shown in FIG. 5A—otherwise normal to polarization beam splitting cell 322K. The angle α can be introduced by polishing one or more surfaces of polarization beam splitters 510K, 530K and/or by polishing a base to which polarization beam splitters 510K, 530K are mounted. In one embodiment, the bottom of polarization beam splitter 510K is polished to the angle α. In another embodiment, the alignment of other optical components external to polarization beam splitting cell 322K may be adjusted to effectively increasing the angle α in excess of any angle introduced by polishing component surfaces. In yet another embodiment, one or both of the otherwise parallel faces 575, 577 and 585, 587 of polarization beam splitters 510K, 530K may be polished to introduce the angle α. Introducing the angle α may leave a slight gap between polarization beam splitters 510K, 530K and optical elements 520K. It should be noted that typically a significant amount of effort is expended to align most optical components of polarization beam splitting cell 322K with the received optical signals to assure that they are either nearly parallel or normal to each other.

Because many of the components of an optical interleaver, such as interleaver 302 shown in FIG. 3B have parallel surfaces that may behave in some degree or another like a F-P cavity, other optical components may be tilted as described above in connection with polarization beam splitting cell 322K in FIG. 5K. Polarization beam splitting cells 322 and 340, in particular, may introduce less chromatic dispersion from tilting, but so may waveplates 124, 216, 232, 270, splitter/combiner 214, polarization beam displacer 251, and beam benders 272, 280, 290. Generally, waveplates are sufficiently thin so as to be a minor source of chromatic dispersion, and therefore in many embodiments may not be tilted in an effort to reduce chromatic dispersion. Although perhaps not readily apparent, the same is true for retro reflector 160. Retro reflector 160 acts as a folded cavity with a single flat surface that is essentially equivalent to two parallel surfaces because of the internal reflection within the retro reflector. Accordingly, in some embodiments, most if not all components within an optical interleaver may be tilted at the angle α.

Figure 5M:
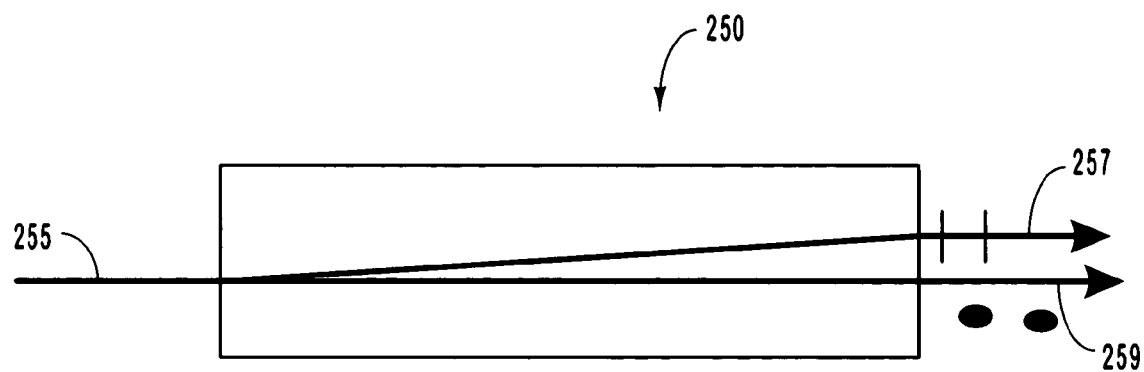
FIG. 5M shows a birefringent crystal used as an optical polarization beam displacer.

FIG. 5M shows a birefringent crystal 250 used as an optical polarization beam displacer (splitter/combiner), as described for example in connection with FIGS. 2A-B above. In FIG. 5M, birefringent crystal 250 could be used to: (i) split unpolarized beam 255 into two orthogonal polarization beams 257, 259 or (ii) separate two sets of channels 257, 259 (even/odd) from an optical signal 255 that includes both sets of channels. For beams traveling the opposite direction, birefringent crystal 250 could be used to: (i) combine two orthogonal polarization beams 257, 259 into a single beam 255 or (ii) combine two separate sets of channels 257, 259 (even/odd) into an optical signal 255 that includes both sets.

The relatively long length of birefringent crystal 250, however, needed to displace sufficiently (or to combine sufficiently displaced beams) presents a number of problems. For example, using a birefringent crystal as an optical polarization beam displacer both increases device dimension and leads to increased chromatic dispersion ripple. (As indicated above in connection with Equation 3b, chromatic dispersion is proportional to the square of the length of the crystal.)

Another problem encountered when using birefringent crystal 250 as an optical polarization beam displacer relates to providing an appropriate AR coating for birefringent crystal 250. By definition, birefringent crystal 250 has two different indexes of refraction. To minimize reflection, each index of refraction requires a different AR coating, which is difficult if not impossible to achieve. Accordingly, when using birefringent crystal 250 as an optical polarization beam displacer, the AR coating selected usually represents a comprise for the two competing indexes of refraction corresponding to the ordinary and extraordinary axes of birefringent crystal 250.

Figure 5N:
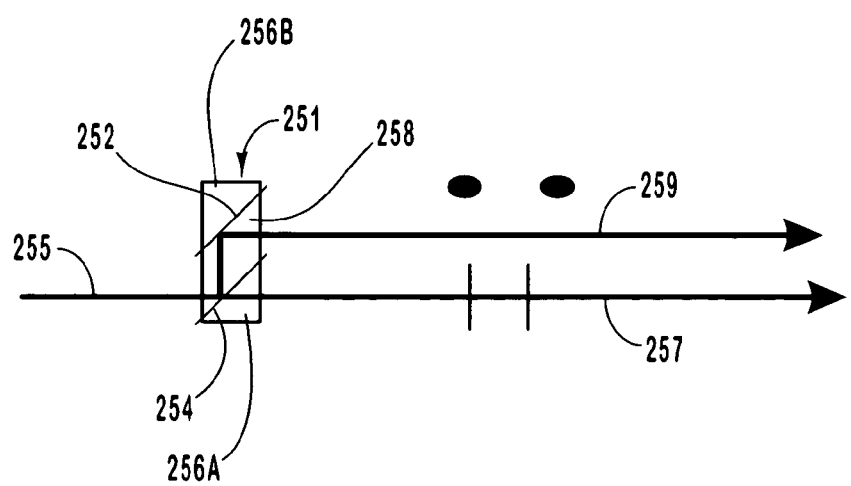
FIG. 5N shows a polarization beam splitter used as an optical polarization beam displacer.

FIG. 5N shows a polarization beam splitter 251 used as an optical polarization beam displacer. When used in this way as an optical polarization beam displacer, a polarization beam splitter may be referred to as optical polarization beam displacer. Similar to the description above of other polarization beam splitters, optical polarization beam splitter 251 includes a parallel plate 258, and one or more prisms 256A-B. The polarization dependent beam splitter 254 is formed by coating the hypotenuse of prism 256A or the corresponding surface of parallel plate 258 with a multilayer dielectric polarizing beam splitter coating. Reflector 252 is formed by coating the hypotenuse of prism 256B or the corresponding surface of parallel plate 258 with a reflective dielectric coating. Alternatively, this coating also may be a multilayer dielectric polarizing beam splitter coating similar to the coating for polarization dependent beam splitter 254. In some embodiments that use a reflective dielectric coating, prism 256B is not need, and therefore eliminated.

Compared to birefringent crystal 250 of FIG. 5M, optical polarization beam splitter 251 reduces the size of the optical polarization beam displacer by nearly ten fold. As described above in connection with FIG. 5A, the polarization beam displacer is bonded with an optical bond, which is important for high power testing. Like birefringent crystal 250, optical polarization beam displacer 251, depending on the direction of propagation, can be used to: (i) split unpolarized beam 255 into two orthogonal polarization beams 257, 259 or combine two orthogonal polarization beams 257, 259 into a single beam 255, and (ii) separate two sets of one or more channels 257, 259 (e.g., even/odd) from an optical signal 255 that includes both sets of one or more channels or combine two separate sets of channels 257, 259 (e.g., even/odd) into an optical signal 255 that includes both sets.

Although similar in geometry to other polarization beam splitters, the reflector 512 and polarization dependent beam splitter 514 of optical polarization beam displacer 251 are usually aligned as closely as possible to 45 degrees with respect to incident optical signals (i.e., optical polarization beam displacer 251 exhibits a 1:1 output aperture). By having a 1:1 output aperture, optical polarization beam displacer 251 evenly splits single beam 255 into orthogonal polarization beams 257, 259, and evenly combines orthogonal polarization beams 257, 259 into single beam 255. In contrast, the output aperture of polarization beam splitters 510, 530 often are mismatched, but because of the two processing legs, these mismatches are complementary and essentially cancel each other out, with some corresponding amount of signal loss.

Unlike birefringent crystal 250 of FIG. 5M, optical polarization beam displacer 251 has a single index of refraction. In one example embodiment, the index of refraction for optical polarization beam displacer 251 is approximately 1.74, compared to 1.44 for polarization beam splitters 510, 530. As indicated above, a single index of refraction simplifies the selection of an efficient AR coating for optical polarization beam displacer 251.

In alternate embodiments of the invention other types of filters may be substituted for the birefringent or polarization beam splitting cells discussed throughout without departing from the scope of the claimed invention. For purposes of this invention a filter will be characterized as a half waveplate when it provides pairs of delay paths the relative optical difference between which corresponds to half that of the incident wavelength or odd integer multiples thereof. A filter will be characterized as a full waveplate when it provides pairs of delay paths the relative optical difference between which corresponds to that of the incident wavelength or even integer multiples thereof. A filter will be characterized as narrowband when it filters odd and even channels differently, i.e. as a full waveplate for the odd channels and a half waveplate for the even channels or vice versa. A filter will be characterized as broadband when it filters odd and even channels similarly, i.e. as either a full waveplate for both the odd and even channels or as a half waveplate for both.

For simplicity, FIG. 6A is an isometric view of a multi-cell implementation of the polarization beam splitting cell of FIG. 5A utilized in the embodiment of the optical interleaver shown in FIG. 3A. Of course as described above, other polarization beam splitting cells, such as those illustrated in FIG. 5K could be used as well. One or more optical elements 520 are shown as a single element spanning the P path between the two splitters 510, 530. This single element presents the same optical pathlength on both the first and second leg of the optical processing loop. Two cells 322 and 340 are shown coupled to one another in series. Sequentially coupling cells allows an optical filter to exhibit a more complex transfer function than the simple sinusoidal output provided by the single cell shown in FIG. 5A. In this example the delay paths provided by harmonic cell 340 and their delay difference are larger than the delay paths and delay difference provided by the fundamental cell 322. This result can be achieved either by fabricating cell 340 from the same optical elements as cell 322 with an increase in the physical length of the elements or by fabricating cell 340 from optical elements with higher indices of refraction than those of cell 322 thus maintaining the same form factor for both cells.

The combination of first cell and subsequent cells can be looked at as establishing by the difference between their delay paths the fundamental sinusoidal harmonic for the sequence and higher order harmonics. In an embodiment of the invention this objective is achieved by designing one of the cells in the sequence with a FSR corresponding with the desired fundamental harmonic and with others of the cells designed with FSRs which are integer fractions of the base FSR. The coefficients or amplitude of each harmonic are provided by varying the coupling ratio percentage, coefficients between a polarized input to a cell and the "P" and "S" polarization axes of the cell as provided by the corresponding polarization beam splitter. The coupling coefficients are varied by tilting of a cell about the propagation path of a polarized input to each cell.

Cell 322 includes the components described above in connection with FIG. 5A. Between cell 322 and 340 on the second optical processing leg the zero-order half waveplate 124 is shown. Cell 340 includes couplers 614, 634 employing polarization dependent beam splitting linked by a pair of delay paths 650 and 646 648, 652. The cell 340 includes opposing polarization beam splitters 610, 630 displaced from one another along the z-axis with one or more optical elements 620 (shown as a single optical element) covering the span between the splitters. Polarization beam splitter 610 is shown with a reflector 612 and a polarization dependent beam splitter 614 displaced from each other in a direction defined by the y-axis. Polarization beam splitter 630 is shown with a reflector 632 and a polarization dependent beam splitter 634 displaced from each other also in a direction defined by the y-axis. The polarization dependent beam splitters have "S" polarization axes which are aligned with one another. Between the couplers one or more optical elements 620 is shown. The various components are shown on top of base 606.

Only one of the beams on one of the legs of the optical processing loop is shown. That polarized beam 542 has, in the example shown, a linearly polarized input vector (see FIG. 6B). This beam enters the cell 322 where it reflected and transmitted by polarization beam splitter 514 onto one end of the pair of delay paths $\theta_{S1}$ and $\theta_{P1}$. At the opposite end of the delay paths reflection and transmission by the polarization beam splitter 534 produces a common output beam 546 which exits the cell on the first leg and proceeds directly to the harmonic cell 340, without intersecting the zero-order half waveplate 124.

On entering the harmonic cell, beam 546 is reflected and transmitted by polarization beam splitter 614 onto one end of the pair of delay paths $\theta_{S2}$ and $\theta_{P2}$. At the opposite end of the delay paths, reflection and transmission by the polarization beam splitter 634 produces a common output beam 546N with orthogonal polarization vectors with odd and even channel components (see FIG. 6C). The process can be extended with more harmonic filters to form a more complex optical filter transfer function.

FIGS. 6B-C show polarization diagrams for opposing ends of the polarization beam splitting cells 322 and 340 shown in FIG. 6A. Polarization diagram 602 shows an embodiment of the possible polarization states for beam 542 entering the filter on the first leg of the optical loop. Polarization diagram 604 shows representative polarization states for beam 546N exiting the last filter cell 340 on the first leg or the optical processing loop. The splitter and retro reflector which form the optical loop between the first and second legs are not shown (see FIGS. 3A-B). The vector with a square at the end contains pass bands with center wavelengths at odd integer multiples of the periodic interval established by the delay difference between the delay paths in the filter. The vector with a circle at the end contains pass bands with center wavelengths at even integer multiples of the periodic interval established by the delay difference between the delay paths in the filter.

Beam 542 enters the first leg with multiplexed odd and even channels, and exits the filter with the odd and even channels demultiplexed onto corresponding one of the two orthogonal output vectors which make up beam 546N. The optical polarization beam splitter/combiner/displacer 250 (see FIGS. 3A-B) splits these orthogonal component vectors into beams which are reflected by retro reflector 160 (not shown, but see FIGS. 3A-3B) and passed along the second leg of the optical processing leg back through cells 340 124, and 322 in a direction opposite to the propagation direction in the first leg. On the second pass through the fundamental cell, any vestigial odd components in the even channels and even components for the odd channels are removed.

Figure 6D:
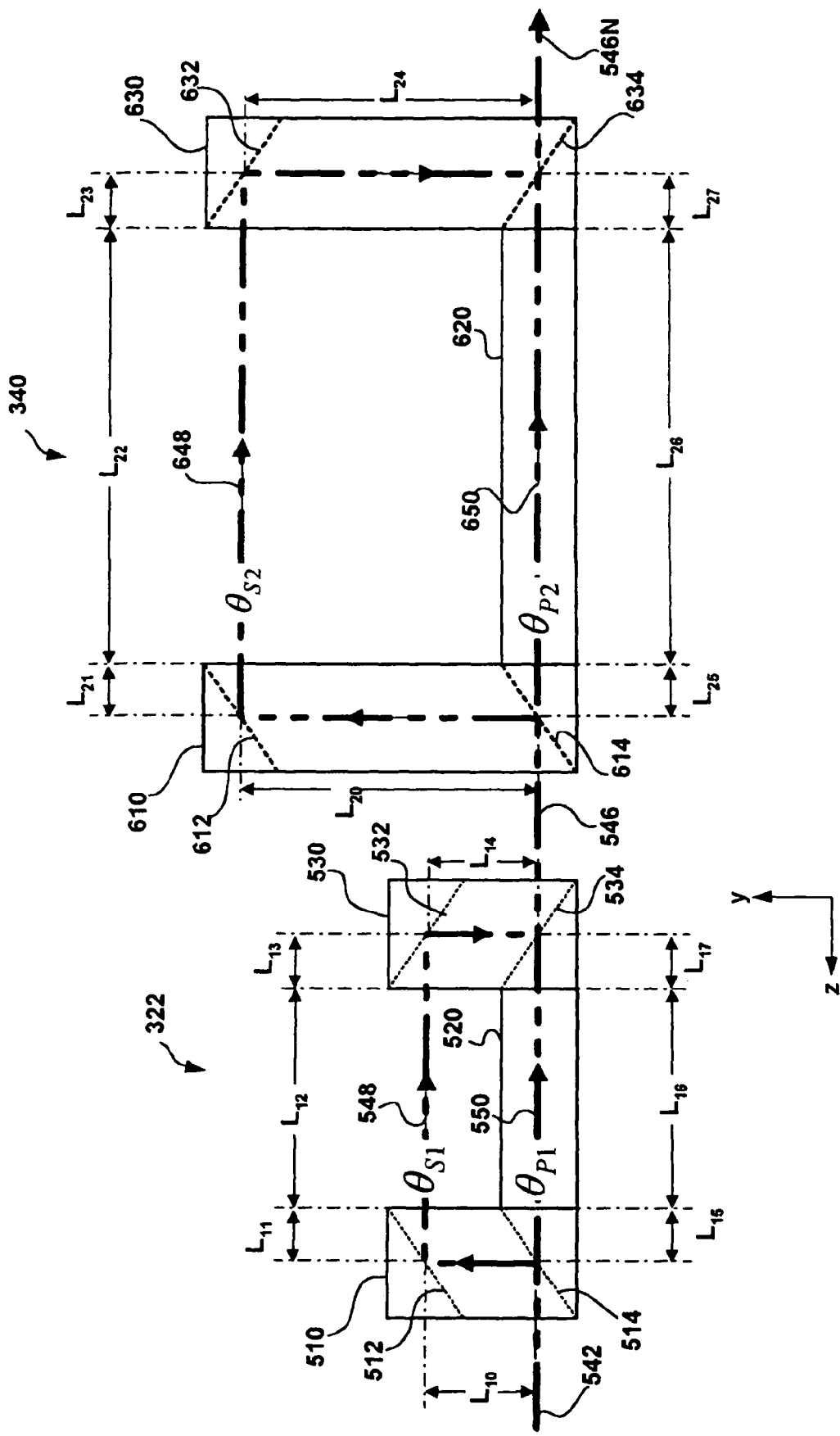
FIG. 6D is a side elevation view of the delay paths of the multi-cell implementation shown in FIG. 6A.

FIG. 6D is a side elevation view of the delay paths of the multi-cell implementation shown in FIG. 6A. The delay introduced into light passing along any delay path is a function of the optical path length of the optical elements which comprise the delay path. Optical path length "L" of an optical element is expressed as the product of the physical distance "d" traversed by a beam propagating through the element multiplied by the index of refraction "n" of the element. Where multiple optical elements are involved, the individual contributions to the optical path length from the individual elements are summed. For purposes of the current invention, optical elements include: a vacuum, a gas, a liquid, a solid or a plasma along the propagation path. The index of refraction of a medium identifies the ratio of the speed of light in a vacuum to that of light in the medium. Where the optical path length varies as here between two delay paths, one path is said to be faster/slower than the other and there is said to be a delay difference between the two.

Beam 542 propagates through the first cell 322 across delay paths $\theta_{P1}$ and $\theta_{S1}$ and through the second cell 340 across delay paths $\theta_{P2}$ and $\theta_{S2}$. Delay path $\theta_{P1}$ comprises optical elements defined by optical path length $L_{15}$-$L_{17}$. Delay path $\theta_{S1}$ comprises optical elements defined by optical path lengths $L_{10}$-$L_{14}$. Delay path $\theta_{P2}$ comprises optical elements defined by optical path length $L_{25}$-$L_{27}$. Delay path $\theta_{S2}$ comprises optical elements defined by optical path lengths $L_{20}$-$L_{24}$. In the embodiment shown, the optical elements defined by optical path lengths $L_{12}$ and $L_{22}$ include air/gas/vacuum. The remaining optical elements may be fabricated from various types of optical glass including: BKx, fused silica, SFx. By proper design of delay paths, the fundamental and higher order harmonics for the optical filter may be established.

The delay for the delay paths $\theta_{P1}$ and $\theta_{S1}$ in the first filter 322 are expressed as a function of the optical path lengths of each path in the following Equations 4-5 respectively.

$$\text{Equation 4:} \quad \theta_{S1} = \left(2\pi\frac{v}{c}\right)\left(\sum_{i=1}^{i=I} d_i n_i\right)$$

$$\text{Equation 5:} \quad \theta_{P1} = \left(2\pi\frac{v}{c}\right)\left(\sum_{j=1}^{j=J} d_j n_j\right)$$

where c and v are the frequency and velocity of light in free space and where I and J are the number of optical elements which make up the delay paths with delays $\theta_{S1}$ and $\theta_{P1}$ respectively. For each of the i optical elements: vacuum, gas, plasma, liquid or solid which make up the delay path $\theta_{S1}$, the $i^{th}$ element has a physical length $d_i$ and an index of refraction $n_i$. For each of the J optical elements: vacuum, gas, plasma, liquid or solid which make up the delay path $\theta_{P1}$, the $j^{th}$ element has a physical length $d_j$ and an index of refraction $n_j$. Optical elements include the optical coatings associated with polarization or intensity dependent beam splitters, which also contribute to optical pathlength and phase accumulations.

The delay difference between the two paths is expressed in Equation 6.

$$\text{Equation 6:} \quad \theta_{S1} - \theta_{P1} = \left(2\pi\frac{v}{c}\right)\left(\sum_{i=1}^{i=I} d_i n_i - \sum_{j=1}^{j=J} d_j n_j\right)$$

The delay difference for the cell is proportional to the difference in the optical path lengths between the S and P delay paths. Similar considerations apply in determining the delays and delay differences for the pair of delay paths in the second cell 340.

The optical path length difference between the two delay paths in a cell corresponds inversely with the free spectral range (FSR) generated by the cell as evidenced in the orthogonal vector components of the output beam from the cell. This relationship is set forth in the following Equation 7.

$$\text{Equation 7:} \quad FSR = \left(\frac{c}{|L_I - L_J|}\right) = \left(\frac{c}{\left|\sum_{i=1}^{i=I} d_i n_i - \sum_{j=1}^{j=J} d_j n_j\right|}\right) = \left(2\pi\frac{v}{\theta_S - \theta_P}\right)$$

where $L_I$ and $L_J$ are the total optical path length of the I and J elements which make up the corresponding delay paths $\theta_S$ and $\theta_P$.

For an optical interleaver the FSR should be a constant perhaps equal to the channel spacing between adjacent odd or even channels, e.g., 100 GHz. Using Equation 7 the delay difference required to generate this result can be determined, and from it a solution to the optical path lengths for each of the delay paths.

FIG. 6E is a side elevation view of the variable coupling between cells of the multi-cell implementation shown in FIG. 6A. Coupling is used to control the amount an input of polarized light that will be projected onto the S and P delay paths of a corresponding cell. Three coupling views 660, 662 and 664 are shown at appropriate locations at the input to cell 322, the interface between cells 322 and 340 and at the output of cell 340 respectively. Only one of beams 542 on one of the optical processing legs, e.g. the first optical processing leg, are shown. The three views 660-664 are taken at the stated locations along the z-axis looking in the positive z direction along the propagation path of the input beam 542. In the first of the coupling views 660, the polarized input is shown with a single input vector "I" and the orthogonal polarization axes PI and SI of the first cell 322 are shown. The input I may include orthogonal input vectors. The amount of light that is coupled onto either delay path in the first cell is determined by the angle $\phi_1$ of the incoming beam vector with the S polarization axis of the cell. In the example shown light from beam 542 will couple to the P and S delay paths in amounts proportionate with the $\sin^2(\phi_1)$ and the $\cos^2(\phi_1)$ of the angle $\phi_1$ between the vector of the beam and the P and S axes. Rotation of the cell about the propagation path of the beam 542 can be used to vary the coupling percentages or ratios between the incoming light and the P and S delay paths. In the next coupling view 662, the beam 546 from cell 322 is coupled with cell 340. The orthogonal polarization vectors $P_1$, $S_1$ present in the output of the fundamental cell 322 are shown along with the orthogonal polarization vectors $P_2$, $S_2$ which are defined by the coupler of the next cell in the sequence, i.e. harmonic cell 340. The amount of light that is coupled onto either delay path in the second cell is determined by the angle $\phi_2$ between the two sets of orthogonal vectors for beam 546 and the P and S axes of cell 340. The last coupling view 664, shows both the orthogonal polarization vectors $P_2$, $S_2$ present in the output of the second cell along with a second set of orthogonal polarization vectors $P_0$, $S_0$. This last orthogonal vector set is used to represent the optical polarization beam splitter/combiner/displacer 250 (see FIG. 3A) used to separate the orthogonal vectors within the single output beam into two discrete beams (not shown). The amount of light coupled onto the output beams is defined by the angle $\phi_3$ between the two sets of orthogonal vectors.

FIG. 6F shows the individual transforms associated with each of the four delay paths on one of the two optical processing legs through the two cell sequence shown in FIG. 6A. FIG. 6F shows the individual transforms 688 associated with each of the four distinct delay paths from the input of beam 542 to the output of beam 546N. The number of discrete paths in a multi-cell sequence of N cells with two delay paths between each equals $2^N$. For two cells there are $2^2$ or 4 discrete paths between an input and an output. The first of these paths is along delay paths $\theta_{S1}$ and $\theta_{S2}$ in the first cell 322 and the second cell 340 respectively. The second of these paths is along delay paths $\theta_{S1}$ and $\theta_{P2}$. The third of these paths is along delay paths $\theta_{P1}$ and $\theta_{S2}$. The fourth of these paths is along delay paths $\theta_{P1}$ and $\theta_{P2}$. The transfer function for the optical filter in single or sequential cell embodiments is the sum of the individual transfer functions associated with each discrete path from input to output. Transfer functions: 688, 690, 692, 694 are shown for the $1^{st}$ to $4^{th}$ paths discussed above. Each transfer function includes two terms 696-698. The first term 696 corresponds to a coefficient in a Fourier series with the coefficient magnitude proportional to the product of the coupling or cross coupling coefficients along the particular path. The second term 698 corresponds to the frequency component associated with that coefficient. The frequency component corresponds with the sum of the delays along a corresponding path. This in turn corresponds with the optical path lengths along each path. The sum of all the transfer functions forms a truncated Fourier series which fully defines the optical filter.

In an embodiment of the invention in which the optical telecommunications grid includes channels spaced apart by 50 GHz, a multi-cell design includes a fundamental cell of 100 GHz FSR and a harmonic cell of 50 GHz FSR to form polarization type square top comb filters. This filter can split an optical stream with 50 GHz channel spacing into two separate optical streams with odd and even 100 GHz channel spacing respectively or combine two optical streams with 100 GHz odd and even channel spacing respectively into a single optical stream with 50 GHz channel can spacing. The $1^{st}$ angle $\phi_1$ can be substantially equal to 45 degrees and the $2^{nd}$ angle can be substantially equal to (45+15) degrees. Similarly, a first cell of 100 GHz FSR and a second cell of 50 GHz FSR can be used to form an intensity type of square top comb filters. The $1^{st}$ splitting ratio substantially equals 50/50% and the $2^{nd}$ splitting ratio substantially equals $\cos^2(45°+15°)/\sin^2(45°+15°)$. In a multi-cell embodiment a square top filter function may be achieved by choosing one cell with the base FSR and remaining cells with FSRs of integer fractional multiples of the base FSR.

Further teachings on sequentially coupled optical filter cells may be found in either of the two following references. See E. Harris et al., *Optical Network Synthesis Using Birefringent Crystals*, JOURNAL OF THE OPTICAL SOCIETY OF AMERICA, VOLUME 54, Number 10, October 1964 for a general discussion of transfer functions related to birefringent crystals. See C. H. Henry et al. U.S. Pat. No. 5,596,661 entitled "*Monolithic Optical Waveguide Filters based on Fourier Expansion*" issued on Jan. 21, 1997 for a general discussion of transfer functions related to wave guides.

Passive Thermal Stabilization

The typical application of optical filters constructed using the above techniques is an optical interleaver. In order for that interleaver to function properly it must create the desired stop bands and pass bands for the odd and even channels which it separates. For current telecommunication applications the filter would be designed with a constant FSR perhaps equal to the channel spacing, i.e., 100 GHz. An optical filter with this FSR would generate the required stop bands and pass bands in each of the orthogonal polarization vectors present on the output. One of the orthogonal output vectors would contain the pass bands associated with the center wavelengths of the odd channels. The other of the orthogonal output vectors would contain the pass bands associated with the center wavelengths of the even channels.

Temperature variations in a interleaver that may effect the performance may result from the environment or from the power transmitted through the interleaver. This can result in the periodic odd and even pass bands generated by the optical filter moving out of alignment with the selected grid, i.e., the ITU grid. This is primarily because the center wavelength of a pass band slips with temperature. This misalignment results in attenuation of signal strength, cross talk and ultimately loss of transmission/reception capability until the optical filter returns to its original temperature. In practice therefore, the optical filters and interleavers fabricated there from must be thermally stable across a range of temperatures.

One solution is to flatten the pass bands of the filter. Multi cell filter designs such as those discussed above allow the pass bands to exhibit higher order harmonics in the form of non-sinusoidal pass band profiles, a.k.a. "flat tops" (see FIG. 11). The close spacing between the channels in a WDM makes it desirable to design a WDM with flat pass bands in order to increase the error tolerance to temperature induced shifts in the pass bands. Even with flat top filter profiles, however, temperature stabilization is still required due to the precise telecommunication channel spacing.

A further solution is to actively stabilize the temperature of the interleaver using a heater or cooler and a closed loop feedback of temperature or wavelength. This solution can be expensive and may increase the form factor of the interleaver. Nevertheless, the current invention may be practiced with active temperature stabilization. A possible benefit to active temperature stabilization is that the optical elements which make up each pair of delay paths may all be fabricated from a common medium with identical indices of refraction and thermal expansion coefficient.

Although capable of being utilized in systems with active temperature stabilization, the current invention is capable of providing temperature stability for the optical filters without active temperature control where appropriate. This greatly enhances the precision of the interleavers or systems fabricated there from and reduces system cost. The current invention is capable of providing passive temperature stabilization of an optical interleaver, through proper selection and design of the optical elements which form each pair of delay paths so that the delay difference for each pair of delay paths and hence the system as a whole remain constant. Since the delay difference is directly related to the difference in the optical path lengths this invention provides thermal stabilization of the delay difference. In an embodiment of the invention either the birefringent or the polarization beam splitting filters may be fabricated with at least one of the delay paths having two optical elements, each of which exhibits a different optical path length response to temperature. Typically, this takes the form of optical elements with different thermal optic coefficients.

The system is designed so that $d(L_I - L_J)/dT$ equals substantially zero. This latter condition is satisfied when the derivative of the denominator in Equation 7 substantially equals zero as set forth in the following Equation 8:

Equation 8: $$\frac{d(L_I - L_J)}{dT} = \frac{d\left(\sum_{i=1}^{i=I} d_i n_i - \sum_{j=1}^{j=J} d_j n_j\right)}{dT} = \sum_{i=1}^{i=I}(d_i \beta_i + \alpha_i n_i d_i) - \sum_{j=1}^{j=J}(d_j \beta_j + \alpha_j n_j d_j) \approx 0$$

where $\alpha_i$ and $\alpha_j$ are the thermal expansion coefficients for each optical element which form the S and P delay paths respectively in each cell and where $\beta_i$ and $\beta_j$ are the thermal optic coefficients for the temperature induced change in the refractive index for each element in the S and P delay paths respectively.

The following Table 1 shows various relevant optical parameters for some optical media which may be used to fabricate the optical elements which make up each pair of delay paths.

The second row sets forth each material's refractive index at 1550 nm. The change in refractive index n as a function of temperature β is set forth in the third row. Row 4 sets forth the coefficient of thermal expansion α for the medium. The selection of physical length of each optical component can be determined by solving Equation 4 and 5 together.

Further passive thermal stabilization may be achieved by horizontally mounting a polarization beam splitting cell to a substrate as illustrated in FIG. 5N.

FIGS. 7A-B are graphs showing the complementary dispersion profiles about a representative center frequency of one of the channels for an optical interleaver fabricated in accordance with the current invention. The complementary dispersion profiles result from the above discussed asymmetry in the fundamental filter between the optical pathlengths along the portions of the first and second legs of the optical loop which intersect the fundamental filter. FIG. 7A shows a representative dispersion profile where coupling of light onto fast and slow paths of either of the optical processing legs is in equal proportions. The dispersion profiles 700 and 702 for the first leg and the second leg are shown relative to the substantially flat line composite dispersion 704. The flat line dispersion profile results from the broadband phase shift for the odd and even channel sets between the first and second optical processing legs in the fundamental filter cell. This phase shift of odd integer multiples of substantially half a wavelength for each center wavelength of a corresponding channel in both the odd set of channels and the even set of channels causes the odd channel set and the even channel set to experience the fundamental filter cell as respectively a full/half waveplate and a half/full waveplate on the first and second legs of the optical loop within the fundamental filter cell. This phase shift is advantageous because it improves the signal integrity associated with multiplexing and de-multiplexing telecom communications by reducing overall chromatic dispersion in each of the channels filtered by the interleaver.

Figure 8A:
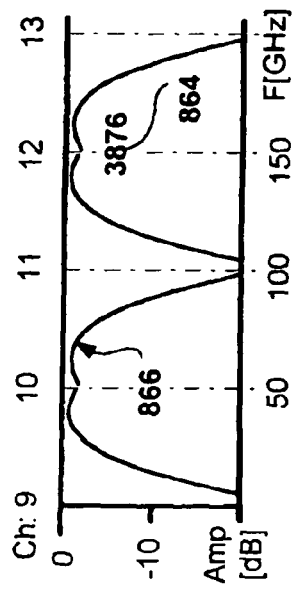
FIGS. 8A-E are signal diagrams showing filter functions at various locations along the optical path of the interleaver shown in FIG. 1.
Figure 8B:
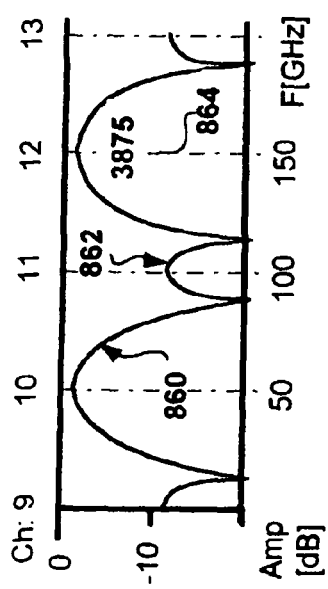

FIG. 7B shows a representative dispersion profile where coupling of light onto fast and slow paths of either of the optical processing legs is in un-equal proportions. The dispersion profiles 710 and 714 for the first and second leg of the optical loop are shown relative to the composite dispersion 716. The composite dispersion exhibits some deviation from the desired flat line response, but the tradeoff in terms of enhanced stop bands in the filter transform is appropriate for some applications as will be shown in the following FIGS. 8A-E FIGS. 8A-E are signal diagrams showing filter functions at various locations along the optical path of the interleaver shown in FIGS. 1-6. The signal diagrams shown in FIGS. 8A-B show the periodic comb filter functions to which the even channels are exposed on the first and second legs of the

TABLE 1

| @1550 nm | Vacuum | Air | BK7 | SF5 | Fused Silica | BaK1 | LaSFN3 |
|---|---|---|---|---|---|---|---|
| n | 1 | 1.00027 | 1.50066 | 1.64329 | 1.4409 | 1.55517 | 1.77448 |
| $\beta = \frac{dn}{dt} \times 10^{-6}$ | 0 | 0* | 0.907465 | 1.407 | 13.7 | 0.066 | 2.293 |
| $\alpha \times 10^{-6}$ | 0 | 0* | 5.1 | 8.2 | 0.052 | 7.6 | 6.2 |

*assuming constant volume optical processing loop respectively. The first comb filter function to which the even channels are exposed on the first leg includes pass bands for the even channels interlaced with residual components, or bleed through, of the odd channels and is shown in FIG. 8A. In the first leg, in this example the even channels are subject to a phase retardation substantially equal to the incident wavelength or integer multiples thereof. Thus there is a pass band 860 for channel 10 and one for channel 12. The center frequency 864 for the pass band for channel 12 coincides with a selected order of the incident wavelength, e.g., order 3875. Between the pass bands for the even channels there is a bleed through of the odd pass bands below the −10 dB level. The bleed through 862 for channel 11, as well as channels 9 and 13 are shown. This bleed through results from asymmetric coupling of light onto the fast and slow paths in amounts other than 50%/50%.

The coupling asymmetries in the first leg between the fast and slow paths of each filter cell are present in the second leg as shown for the even channels in FIG. 8B. Because of the wavelength shift of $\lambda/2$ or odd integer multiples thereof, in the optical pathlength difference between the portion of the first and second legs which intersect the fundamental cell, the even channels are subject to a second comb filter function different than that to which they were exposed in the first sub-stage. This second comb filter function shown in FIG. 8B includes narrow stop bands, and substantially attenuated bleed-through of the odd channels. There is a pass band 866 for channel 10 and one for channel 12 with a slight dip in the flat top. The center frequency 864 for channel 12 coincides with a different selected order of the incident wavelength, e.g. order 3876, than was the case in the filter of the first sub-stage as shown in FIG. 8A.

Figure 8E:
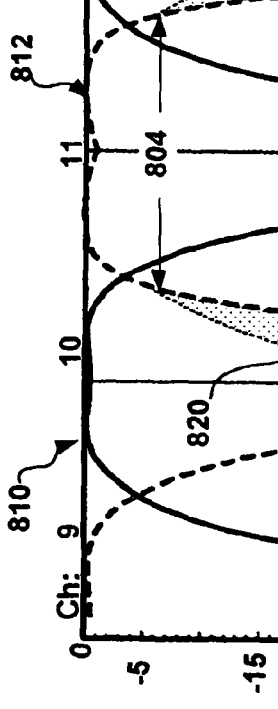
Figure 8C:
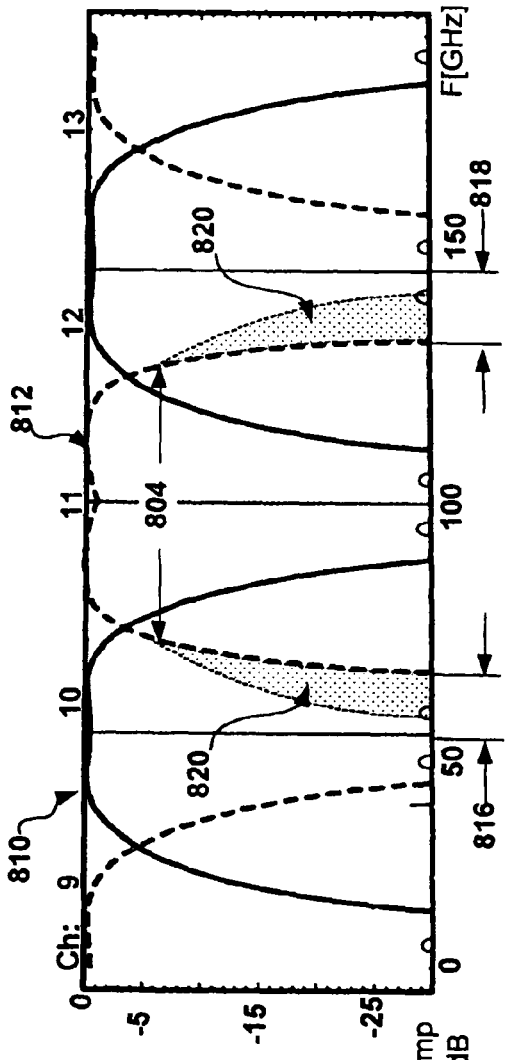
Figure 8D:
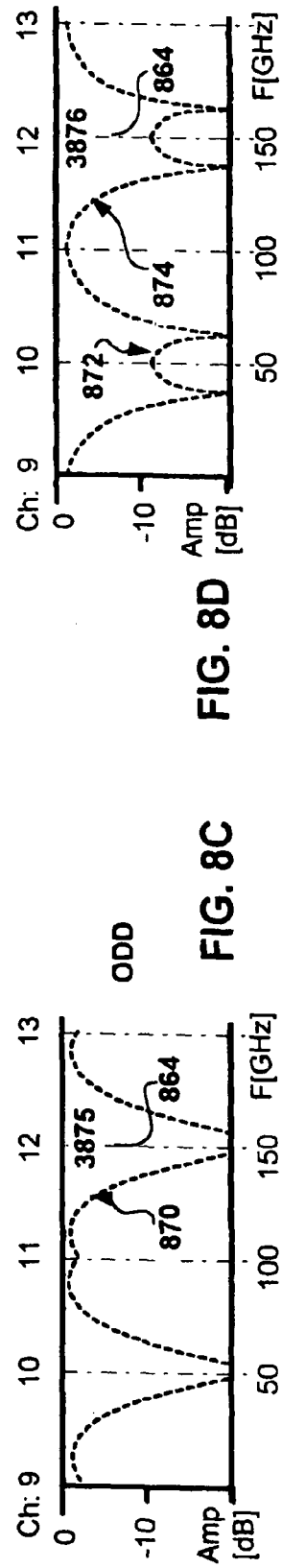

The signal diagrams shown in FIGS. 8C-D show the comb filter functions to which the odd channels are exposed on the first and second legs of the optical processing loop respectively. In the first leg, in this example the odd channels are subject to the second comb filter function with a wavelength shift of $\lambda/2$ or odd integer multiples thereof. Thus there is a pass band 870 for channel 11 and one for channels 9 and 13. The center frequency 864 for the pass band for channel 12 coincides with a selected order of the incident wavelength, e.g. order 3875. The filter function for the odd channels in the first sub-stage exhibits narrow stop bands, and substantially attenuated bleed-through. The coupling asymmetries in the first leg between the fast and slow paths of each filter cell are present in the second leg.

As show in FIG. 8D the wavelength shift of $\lambda/2$ in the optical pathlength difference between the portion of the first and second legs which intersects the fundamental cell results in the odd channels also being subject to a different, i.e. complementary filter function, to that experienced in the first leg. The odd channels are exposed to the first comb filter function with a wavelength shift of $\lambda/2$ or odd integer multiples thereof. There is a pass band 874 for channel 11 and one for channels 9, 13. Between the pass bands for the odd channels there is a bleed through of the even pass bands below the −10 dB level. The bleed through 872 for channel 10, as well as channel 12 is shown. This bleed through results from asymmetric coupling of light onto the fast and slow paths in amounts other than 50%/50%. The same coupling ratios used in the first leg are applied in the second leg. The center frequency 864 for the pass band for channel 12 coincides with a different selected order of the incident wavelength, e.g. order 3876, than was the case in the fundamental filter on the first leg as shown in FIG. 8C.

FIG. 8E shows the composite performance for the interleaver for both the odd and even channels. The pass band 810 for even channel 10 as well as for channel 12 is shown. The pass band 812 for odd channel 11 as well as for channels 9 13 are also shown. Each pass band exhibits steep side profiles and broad stop bands when compared with prior art designs. The pass band 812 for channel 11 is shown with a broad flat top 804 and with broad pass bands 816, 818. Superimposed on the pass band 812 is a skirt 820 representative of traditional pass band profiles. By comparison the current interleaver exhibits a significant improvement in the pass band profiles it generates with relatively steeper sides and broader stop bands. These improvements translate into increases in the signal integrity of the telecommunications data handled by the interleaver.

In alternate embodiments of the invention, the various filter, retro reflector and other elements of the optical interleaver may be fabricated on a common semi-conductor substrate. The various components: reflectors, couplers, and optical elements may be fabricated using a combination of etching and deposition techniques well know in the semiconductor industry.

The foregoing description of preferred embodiments of the invention has been presented for purposes of illustration and description. It is not intended to be exhaustive or to limit the invention to the precise forms disclosed. Obviously many modifications and variations will be apparent to practitioners skilled in this art.

We claim:

1. A device for processing optical signals, comprising:
   a first collimator that optically couples an optical signal for processing;
   one or more optical components that are optically coupled to the first collimator and perform optical processing on the optical signal, wherein at least one optical component has two surfaces, each of the two surfaces including an antireflective coating, at least one of the two surfaces being tilted at an angle from normal with respect to the optical signal so as to reduce chromatic dispersion ripple below what would otherwise result if the two surfaces were normal to the optical signal; and
   a second collimator optically coupled to the one or more optical components such that the second collimator is able to receive the optical signal from the first collimator and one or more optical components.

2. A device as recited in claim 1, wherein the one or more optical components comprise a plurality of optical components.

3. A device as recited in claim 2, wherein exactly one of the plurality of optical components is tilted.

4. A device as recited in claim 2, wherein more than one of the plurality of optical components are tilted.

5. A device as recited in claim 1, wherein the two surfaces are parallel to each other.

6. A device as recited in claim 1, wherein an end of the at least one optical component is polished to the angle, such that when the at least one optical component is mounted on the end to a flat surface, the two parallel surfaces of the at least one optical component are tilted at the angle.

7. A device as recited in claim 1, wherein the angle is between 2.5 and 3.0 degrees, inclusive.

8. A device as recited in claim 1, wherein the optical signal is a broadband telecommunication signal.

9. A device as recited in claim 1, wherein the one or more optical components include a beam splitter and a reflector.

10. The device of claim 9, wherein the beam splitter and the reflector are configured to asymmetrically split and combine the optical signal between a fast delay path and a slow delay path depending upon the polarization of the optical signal.

11. A filter cell for filtering optical signals propagating on each of two legs of an optical loop which intersects the filter cell, the filter cell operating as a full waveplate to a first set of one or more optical signals and a half waveplate to a second set of one or more optical signals on one of the two legs and as a half waveplate to the first set of one or more optical signals and a full waveplate to the second set of one or more optical signals on another of the two legs, the filter cell comprising:

a first polarization beam splitter (PBS) oriented to split or combine the first and second sets of one or more optical signals depending on polarization and propagation direction along the optical loop, the first PBS having two surfaces, at least one of which is tilted at an angle from normal with respect to the propagation direction of the optical signals so as to reduce chromatic dispersion ripple that would otherwise be introduced if the two surfaces were normal to the propagation direction;

one or more optical components optically coupled to the first PBS for optically processing at least one of the optical signals; and a second PBS optically coupled to the first PBS and the one or more optical components to split or combine the first and second sets of one or more optical signals depending on polarization and propagation direction along the optical loop, the second PBS having two surfaces, at least one of which is tilted at an angle from normal with respect to the propagation direction of the optical signals so as to reduce chromatic dispersion ripple that would otherwise be introduced if the two surfaces where normal to the propagation direction, wherein the second PBS is oriented to split the first and second sets of one more optical signals when the first PBS is oriented to combine, and wherein the second PBS is oriented to combine the first and second sets of one or more optical signals when the first PBS is oriented to split.

12. A filter cell as recited in claim 11, wherein the first PBS and the second PBS comprise at least one prism and a parallel plate.

13. A filter cell as recited in claim 12, wherein at least one surface of the parallel plate is coated with a multilayer dielectric polarizing beam splitter coating.

14. A filter cell as recited in claim 13, wherein two surfaces of the parallel plate are coated with a multilayer dielectric polarizing beam splitter coating.

15. A filter cell as recited in claim 12, wherein at least one surface of the parallel plate is coated with a reflective dielectric coating.

16. A filter cell as recited in claim 12, wherein at least one of the first PBS or the second PBS comprises two prisms and a parallel plate.

17. A filter cell as recited in claim 11, wherein the two surfaces of each PBS are parallel to each other.

18. A filter cell as recited in claim 17, wherein an end of the first PBS adjacent to the two parallel surfaces is polished to the angle, such that when the first PBS is mounted on the end to a flat surface, the two parallel surfaces of the first PBS are tilted at the angle.

19. A filter cell as recited in claim 11, wherein the first and second PBSs are mounted to a base, and wherein at least a portion of the base is polished to the angle such that either the first PBS or the second PBS or both are tilted at the angle.

20. A filter cell as recited in claim 11, wherein the angle is between 2.5 and 3.0 degrees, inclusive.

21. A filter cell as recited in claim 11, wherein the optical signals comprise a broadband telecommunication signal.

22. A filter cell as recited in claim 11, wherein the two surfaces of the first PBS are coated with an antireflective coating.

23. A filter cell as recited in claim 11, wherein the filter cell further comprises a pair of delay paths including a fast delay path and a slow delay path.

24. A filter cell as recited in claim 23, wherein the first PBS and the second PBS asymmetrically split and combine the optical signals between the fast delay path and the slow delay path depending on the optical signals' polarization.

25. An optical interleaver for processing optical signals which include a first set of one or more optical signals and a second set of one or more optical signals, the optical interleaver comprising:

a filter cell for filtering optical signals propagating on each of two legs of an optical loop which intersects the filter cell, comprising:

a first polarization beam splitter (PBS) oriented to split or combine the first and second sets of one or more optical signals depending on polarization and propagation direction, the first PBS having two surfaces, at least one of which is tilted at an angle from normal with respect to the propagation direction so as to reduce chromatic dispersion ripple introduced by the filter cell;

one or more optical components optically coupled to the first PBS; and a second PBS optically coupled to the first PBS and the one or more optical components, the second PBS having two surfaces, at least one of which is tilted at an angle from normal with respect to the propagation direction of the optical signals, wherein the second PBS is oriented to split when the first PBS is oriented to combine;

a retro reflector optically coupled with the filter cell to reflect the optical signals from one of the two legs to another of the two legs to form the optical loop; and an optical polarization beam displacer optically coupled between the filter cell and the retro reflector to split or combine the first and second sets of one or more optical signals depending on polarization and propagation direction along the optical loop.

26. A optical interleaver as recited in claim 25, wherein the filter cell further comprises a zero-order half waveplate optically coupled to the second PBS.

27. An optical interleaver as recited in claim 25, wherein the filter cell comprises a fundamental filter cell.

28. An optical interleaver as recited in claim 27, further comprising a harmonic filter cell optically coupled to the fundamental filter cell and the optical polarization beam displacer to filter the optical signals on both legs of the optical loop with a higher order harmonic.

29. An optical interleaver as recited in claim 28, further comprising a zero-order waveplate optically coupled between the harmonic filter cell and the fundamental filter cell to rotate polarization vectors of the optical signals between the fundamental filter cell and the harmonic filter cell in order to align the fundamental filter cell and the harmonic filter cell with each other.

30. An optical interleaver as recited in claim 25, wherein the filter cell further comprises a pair of delay paths including a fast delay path and a slow delay path.

31. An optical interleaver as recited in claim 30, wherein the first PBS and the second PBS asymmetrically split and combine the optical signals between the fast delay path and the slow delay path depending on the optical signals' polarization.

32. An optical interleaver as recited in claim 30, wherein the first PBS and the second PBS symmetrically split and combine the optical signals between the fast delay path and the slow delay path depending on the optical signals' polarization.

33. An optical interleaver as recited in claim 25, wherein the first and second sets of one or more optical signals comprise an odd set of channels and an even set of channels.

34. An optical interleaver as recited in claim 25, wherein the two surfaces of each PBS are parallel to each other.

35. An optical interleaver as recited in claim 25, wherein the optical polarization beam displacer comprises a polarization beam splitter.

* * * * *